United States Patent [19]
Teowee et al.

[11] Patent Number: 5,838,483
[45] Date of Patent: Nov. 17, 1998

[54] PHOTOCHROMIC DEVICES

[75] Inventors: Gimtong Teowee; Pierre-Marc Allemand; John P. Cronin; Juan Carlos Lopez Tonazzi; Anoop Agrawal, all of Tucson, Ariz.

[73] Assignee: Donnelly Corporation, Holland, Mich.

[21] Appl. No.: 798,725

[22] Filed: Feb. 13, 1997

Related U.S. Application Data

[63] Continuation of Ser. No. 386,771, Feb. 10, 1995, Pat. No. 5,604,626.

[51] Int. Cl.⁶ ........................................................ G02F 1/15
[52] U.S. Cl. ............................................. 359/265; 359/275
[58] Field of Search ..................................... 359/241, 265, 359/275

[56] References Cited

U.S. PATENT DOCUMENTS

| | | | |
|---|---|---|---|
| 5,073,012 | 12/1991 | Lynam | 359/265 |
| 5,140,955 | 8/1992 | Varaprasad et al. | 359/275 |
| 5,277,986 | 1/1994 | Cronin et al. | 428/432 |
| 5,384,653 | 1/1995 | Benson et al. | 359/270 |
| 5,604,626 | 2/1997 | Teowee et al. | 359/265 |

*Primary Examiner*—Mark Hellner
*Attorney, Agent, or Firm*—Fitzpatrick, Cella, Haper & Scinto

[57] ABSTRACT

A photochromic device is provided which allows the user to leave the device in a high transmissive state even when exposed to a source of radiation and to control the degree of darkening achieved while exposed to the source of radiation.

21 Claims, 4 Drawing Sheets

PHOTOCHROMIC DEVICES

This application is a continuation of application Ser. No. 08/386,771, now U.S. Pat. No. 5,604,626, filed Feb. 10, 1995.

BACKGROUND OF THE INVENTION

1. Field of the Invention

This invention is directed to photochromic devices, and in particular user controllable photochromic ("UCPC") devices. The invention is also directed to methods of making the photochromic devices of this invention.

2. Related Prior Art

Photochromic (PC) devices typically decrease transmission reversibly when they are exposed to radiation. The main commercial applications for such devices hitherto have been in eyewear. Conventional PC elements are difficult and expensive to make in larger area elements, such as vehicular and architectural windows. The change in color or transmission of conventional PC devices is not user controllable. In applications such as, for example, energy efficient glazing, eyewear or automotive glazing and rear-view mirrors it would be desirable to have photochromic devices that are capable of, at the discretion of the user, controlling transmission when exposed to radiation. For instance it would be advantageous to employ a PC device which will not darken in the presence of illumination unless the user so desires, or that darkens to a reduced partial transmission level that the user determines and selects. Such functionality would provide a number of benefits for automotive and architectural glazings.

Although electrochromic (EC) devices have been employed to provide user control of light transmission, such devices require an externally applied voltage to control the electrochromic behavior of the device. On the other hand, PC devices do not require an externally applied voltage to achieve color change, but instead rely on radiation. EC devices also suffer from the increased potential drop across the conductive substrate as the device is made larger. Advantageously, the radiation effecting a PC device, such as solar radiation is substantially uniform over the area of the device and thus the non-uniformity in coloring associated with large area EC devices would be substantially alleviated if PC technology could be applied to large area devices. However, conventional PC technology has not provided for large area devices or user controllability.

Conventional photochromic glass is available, for example, under the tradename PHOTOGRAY EXTRA® from Corning Glass Works, U.S.A., and is widely employed in ophthalmic photochromic glasses. Such glasses darken when exposed to sunlight as a result of the activation of silver halide microcrystals which are uniformly distributed throughout the glass. When exposed to ultraviolet and short wavelength visible radiation, the microcrystals dissociate into free silver particles which cluster together to form silver agglomerates. These agglomerates absorb visible light between roughly 400 nm and 700 nm. In addition, it is known to incorporate cuprous ions into the glass matrix to assist photo-reduction of the silver ions to silver metal during darkening. However, as noted previously the production of large area photochromic glass has proved technically difficult and expensive. Moreover, whether conventional photochromic glass darkens or not when illuminated by radiation is not controllable by the user.

Attempts have been made to prepare photoelectrochromic display devices with little success. For example, P.M.S. Monk, et al., Electrochimica Acta, 38 (18), 2759–2764 (1993) discloses a photoelectrochromic display device having (i) a layer of $WO_3$ on indium tin oxide coated glass and (ii) a light-sensitive layer of vanadium oxide or cadmium sulfide on indium tin oxide coated glass with (iii) an electrolyte, such as a mixture of polyethylene oxide, phosphoric acid and acetonitrile, disposed between the $WO_3$ and the light sensitive layer. Either the indium tin oxide adjacent the cadmium sulfide or the vanadium oxide itself of these devices are protonated. While some of the devices of this reference achieved a degree of coloration upon exposing the device to an illumination source in a shorted state, such coloration was not reversible, i.e., the device could not be returned to the bleached state by the application of an external electric potential. Moreover, the degree of color modulation obtained with the disclosed devices was only on the order of 0.06 absorbance units. A device capable of only a small degree of color modulation and that cannot be reversibly bleached after coloration is clearly inadequate for vehicular and architectural applications or any other application requiring a PC device that can be bleached after coloration.

An object of this invention is to provide devices or elements, which are capable of allowing the user the discretion to leave a PC device in a high transmissive state even when the device is exposed to a source of illumination.

Another object of this invention is to provide methods to make the photochromic devices of this invention.

Another object of this invention is to provide devices which can be bleached to the original high transmissive state even in the presence of radiation at the users discretion.

Another object of this invention is to provide commercially feasible large area photochromic devices.

A further object of this invention is to provide user control over the degree of coloration of a PC device.

SUMMARY OF THE INVENTION

This invention is directed to photochromic devices, and in particular user controllable photochromic devices. The transmissive properties of the photochromic device that is user controllable may be advantageously manipulated by the user at the user's discretion. The devices of this invention may also be bleached at the users discretion by application of an external potential after the device has been darkened.

A first embodiment of this invention is directed to a photochromic device comprising a first conducting electrode opposing a second conducting electrode, wherein at least one of said conducting electrodes is transparent, a radiation sensitive electrode disposed on an opposing surface of said first conducting electrode, an interconnecting medium preferably containing a redox promoter, said interconnecting medium disposed between said second conducting electrode and said radiation sensitive electrode and at least one of (a) a first ion intercalative electrode disposed between said interconnecting medium and said second conducting electrode; (b) a second ion intercalative electrode disposed between said radiation sensitive electrode and said interconnecting medium; and (c) a redox active species in said interconnecting medium. The preferred device of this invention includes the first ion intercalative electrode disposed between the second conducting electrode and the interconnecting medium. However, the devices of this invention include those having any one of (a), (b) and (c), or all of (a), (b) and (c) or two of any of (a), (b) and (c).

The ion intercalative electrode may be located at a first position between the interconnecting medium and the second conducting electrode, i.e., the first ion intercalative electrode, or at a second position between the radiation sensitive electrode and the interconnecting medium, i.e., the second ion intercalative electrode. It is also possible for ion intercalatable electrodes to be present at both the first and second position in the device, in which case the intercalatable material of each can be the same or different. The intercalatable material of which the ion intercalative electrode is comprised is capable of being intercalated with ions to cause a reversible color change in the material. It is believed that the redox promoter assists in the creation of charged carriers. Redox active species which may be employed in the present invention are also capable of undergoing a reversible color change and may be the same or different than the redox promoter.

The photochromic device of this invention will also preferably have an electrical connection means for electrically connecting said first conducting electrode and said second conducting electrode. In addition, if user controllability is desired then the electrical connection means further comprises control means for controlling the electrical resistance of the electrical connection between the two conducting electrodes. The control means may, for example, include an open or close switch for the electrical connection between the two conducting electrodes. Another exemplary control means may provide a variable resistance in the electrical connection so that the electrical resistance between the first conducting electrode and the second conducting electrode can be variably controlled.

The photochromic device of this invention may further comprise a first substrate disposed on an outer facing surface of said first conducting electrode and a second substrate disposed on an other outer facing surface of said second conducting electrode. At least one of said substrates is transparent. When the PC device of this invention is a window or glazing, then both conducting electrodes and both substrates are transparent.

The photochromic devices of this invention allow for the decrease of light transmission upon exposure to radiation only if desired by the user. The devices in this invention can be made for a large area such as a glazing for a building or an automobile or for a small area such as for eyewear. Moreover, the photochromic devices of the present invention may be bleached to the original high transmissive state at the discretion of the user, even in the presence of radiation, by the application of an external electrical potential to the device.

The invention is further directed to methods of preparing the photochromic devices of this invention. One such method is directed to preparing a photochromic device comprising the steps of:

(a) forming a radiation sensitive electrode on a surface of a first conducting electrode;

(b) forming an ion intercalative electrode on a surface of a second conducting electrode;

(c) assembling said first conducting electrode having said radiation sensitive electrode formed thereon and said second conducting electrode having said ion intercalative electrode formed thereon to form a cell with said radiation sensitive electrode facing said ion intercalative electrode;

(d) providing said cell with an interconnecting medium containing a redox promoter, said interconnecting medium disposed between said radiation sensitive electrode and said ion intercalative electrode; and (e) providing an electrical connection means for electrically connecting said first conducting electrode and said second conducting electrode. The method may further comprise the step of forming another ion intercalative electrode on the surface of the radiation sensitive electrode opposite the first conducting electrode prior to assembling the device.

Another method of this invention is related to preparing a photochromic device comprising the steps of:

(a) forming a radiation sensitive electrode on a surface of a first conducting electrode;

(b) assembling said first conducting electrode having said radiation sensitive electrode formed thereon and a second conducting electrode to form a cell with said radiation sensitive electrode facing inward;

(c) providing an interconnecting medium containing a redox promoter and at least one redox active species in said cell between said second conducting electrode and said radiation sensitive electrode; and (d) providing an electrical connection means for electrically connecting said first conducting electrode and said second conducting electrode. The redox promoter and redox active species can be the same or different.

Yet another method of this invention is directed to preparing a photochromic device comprising the steps of:

(a) forming a radiation sensitive electrode on a surface of a first conducting electrode;

(b) forming an ion intercalative electrode on surface of said radiation sensitive electrode;

(c) assembling said first conducting electrode having said radiation sensitive electrode and said ion intercalative electrode formed thereon with a second conducting electrode to form a cell with said ion intercalative electrode facing said second conducting electrode;

(d) providing said cell with an interconnecting medium containing a redox promoter, said interconnecting medium disposed between said second conductive electrode and said ion intercalative electrode; and (e) providing an electrical connection means for electrically connecting said first conducting electrode and said second conducting electrode. The methods of this invention may further comprise the step of providing electrical connection means having control means so that the user can advantageously control the transmission state of the device when exposed to a radiation source.

These and other objects, aspects, features and advantages of the present invention will become apparent from the following detailed description of the preferred embodiments taken in conjunction with the accompanying drawings.

DESCRIPTION OF THE PREFERRED EMBODIMENTS

Figure 1A:
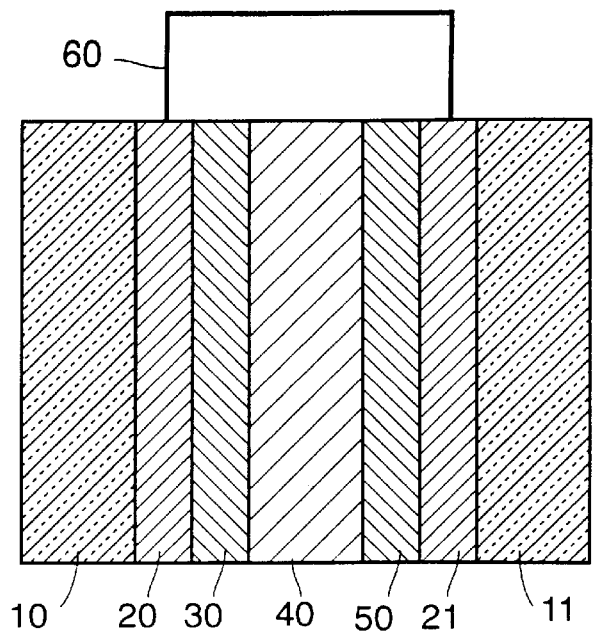
FIG. 1(A) is a schematic view of a typical UCPC transmissive device of this invention.

The present invention is directed to a photochromic device. This device is capable of being controlled by the user when control means are used with the device. The photochromic devices of this invention can be colored as photochromic devices without user controllability if so desired. However, it is most preferable to include control means in the photochromic device so that the reversible decrease in transmission of the device upon exposure to radiation can be controlled by the user. While the devices of this invention can be designed to utilize or be activated by any form of radiation, in the preferred embodiment the type of radiation utilized should be a component of solar radiation.

One embodiment of this invention is directed to a photochromic device having a first conducting electrode opposing a second conducting electrode. At least one of the conducting electrodes is substantially transparent. However, when the PC device is employed as a window or glazing then both conducting electrodes are substantially transparent. A radiation sensitive electrode is disposed on the inner facing surface of the first conducting electrode and an ion intercalative electrode is disposed on the inner facing surface of the second conducting electrode. The first conducting electrode/radiation sensitive electrode is in a spaced-apart relationship with the second conducting electrode/ion intercalative electrode and the void between the radiation sensitive electrode and the ion intercalative electrode is occupied by an interconnecting medium. In addition, a electrical connection means, such as for example, a wire or an equivalent low resistance circuit or pathway, provides an external electronically conductive connection between the two conducting electrodes. Significantly, the photochromic device of this invention can be made user controllable by providing control means to control the electrical connection between the two conducting electrodes.

The PC device of this invention will also preferably have a first substrate disposed on the outer surface of the first conducting electrode and a second substrate disposed on the outer surface of the second conducting electrode. At least one substrate is transparent and both will be transparent if the PC device is employed as a window or glazing.

A significant consideration for the PC devices of this invention is that transmission of radiation through the whole device when the device is in the clear state is relatively high, with at least 50% transmission (visible region, CIE Standard Illuminant C, Photopic Detector) preferred, at least 65% transmission more preferred and at least 75% transmission most preferred. Moreover, when the PC devices of this invention are in the darkened state under typical outdoor lighting conditions the transmission of light through the device as a whole is dimmed to preferably less than 40% transmission, more preferably less than 25% transmission and most preferably less than 15% transmission. These characteristics provide preferred PC devices of this invention having an attenuation ratio [transmission in the clear state to transmission in the darkened state] of at least 2. Typically, the time period for a PC device of this invention to go from its clear state to one half the transmission of its clear state, i.e., the time to reach an attenuation ratio of 2, is preferably 30 minutes, more preferably 15 minutes and most preferably 10 minutes after the device is shorted during exposure to general outdoor lighting conditions. Generally, the time elapsed in bleaching from the dim state to 50% transmission through the whole device is less than 60 minutes, preferably less than 40 minutes and more preferably less than 20 minutes. The above ranges of clear state transmission apply when utilizing clear soda lime window glass of about 2.2 mm thickness as the substrates of the PC device. Preferably user control between the clear state and the dim state is achieved by electrical connection of the radiation sensitive electrode and the ion intercalative electrode via an electrical link of resistance varying from nominally 0 ohms to approximately 10,000 ohms.

Figure 1B:
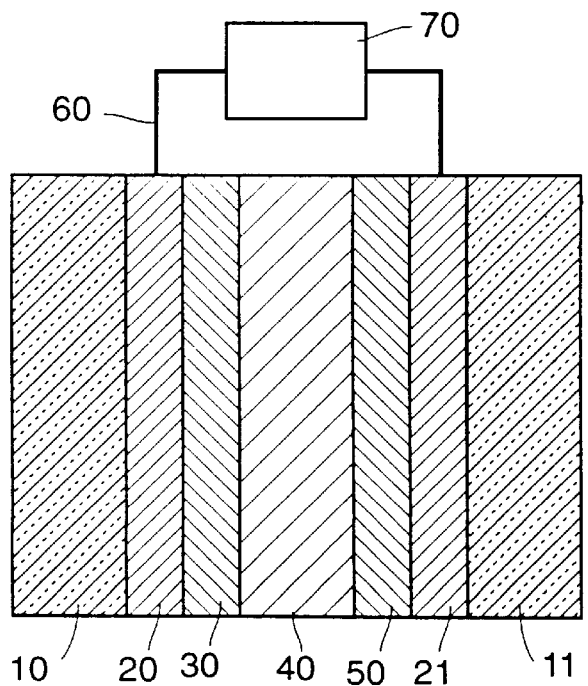
FIG. 1(B) is schematic view of a preferred UCPC device wherein the electrical connection means 60 includes control means 70.

FIG. 1(A) illustrates an example of a PC device of this invention having a first substrate 10 with a transparent first conducting electrode 20 disposed on the inner facing surface of the first substrate 10. A radiation sensitive electrode 30 is disposed on the surface of the first conducting electrode 20. A second conducting electrode 21 is disposed on the inner facing surface of a second substrate 11 and an ion intercalative electrode 50 is disposed on the surface of the second conducting electrode 21. The first substrate 10/conducting electrode 20/radiation sensitive electrode 30 laminate is arranged in an opposing spaced-apart relationship with the second substrate 11/conducting electrode 21/ion intercalative electrode 50 laminate to form a space which is occupied by interconnecting medium 40. In addition, an electrical connection means 60, for electrically connecting the two conducting electrodes 20 and 21, e.g., a wire, is connected to the two conducting electrodes 20 and 21. The electrical connection means 60 of the device of FIG. 1(A) has an uninterrupted low resistance pathway. A preferred embodiment of this invention is illustrated in FIG. 1(B) wherein the electrical connection means 60 includes control means 70. A control means 70, e.g., an on/off switch, intersects the electrical connection means to control the resistance of the electrical connection between the two conducting electrodes 20 and 21 such as, for example, by allowing for the opening and closing of the circuit created by the electrical connection means.

Typically the substrates 10 and 11 of the PC device illustrated in FIG. 1 are transparent glass or plastic such as, for example, acrylic, polystyrene, polycarbonate, allyl diglycolcarbonate [CR39 available from PPG Industries, Pittsburgh, Pa.], SAN [styrene acrylonitrile copolymer], poly(4-methyl-1-pentene), polyester, polyimide, etc. It is preferable for the transparent substrates 10 and 11 to be either clear or tinted soda lime glass, preferably float glass. If plastic is employed, it is preferably abrasion protected and barrier protected using a hard coat of, for example, a silica/silicone antiabrasion coating, a diamond-like protection coating or their like, such as is well known in the plastic glazing art. Generally, the substrates have a thickness in the range of about 0.01 mm to about 10 mm, and preferably in the range from about 0.1 mm to 5 mm. However, any substrate of any thickness which will provide a functioning PC device may be employed.

The conducting electrodes 20 and 21 may be of the same or different material and can have different conductivities. At least one of the conducting electrodes must be transparent, although when the PC device is a window device then both conducting electrodes 20 and 21 must be transparent. The materials employed for the conducting electrodes are well known to those skilled in the art. Exemplary conducting electrode materials are coatings of doped indium oxide, doped tin oxide, doped zinc oxide and the like, as well as all thin metallic coatings that are substantially transparent, such as those of gold, silver, aluminum, nickel alloy, and the like. It is also possible to employ multiple layer coatings, such as those available from Libbey Owens Ford (LOF) under the tradename of TEC-Glass® or those available from PPG Industries under the tradenames SUNGATE® 300 and SUN- GATE® 500. The preferred sheet resistance of these conductive coatings should be below 100 Ω/□.

The TEC-Glass® and SUNGATE® conductive coated glass comprises a multi-layer thin film structure, which includes a thin coating of fluorine-doped tin oxide with additional undercoating thin film layers disposed between the fluorine-doped tin oxide layer and the underlying glass substrate. This structure inhibits reflected color and increases light transmittance resulting in a non-iridescent glass structure having a low haze (typically less than or equal to 5%). The multi-layer coating stack is made from an on-line (preferably in-bath) pyrolytically-coated (preferably by chemical vapor deposition) float glass. The layers undercoating the doped tin oxide typically comprise a silica/silicone layer and a tin oxide layer. The transparent conducting electrode used in this invention may be a thin layer of ITO ($In_2O_3$ containing preferably approximately 2 to 20 mole % of $SnO_2$).

Typically, the conducting electrodes 20 and 21 are disposed on a substrate of glass or plastic as a coating and the coating has a thickness in the range of about 5 nm to about 10,000 nm, and preferably about 10 nm to about 1,000 nm. However, any thickness of the conducting electrode coating may be employed that provides adequate conductance for the PC device and which does not appreciably interfere with the transmission of light where required.

A significant component of the device of this invention is the radiation sensitive electrode 30. The radiation sensitive electrode is typically comprised of a material that absorbs at least a part of solar radiation. Upon the absorption of this radiation, holes (positive charged carriers) and electrons (negative carriers) may be created in this electrode. The radiation sensitive electrode is preferably a semiconductor such as II–VI, III–V and II–V elemental and compound semiconductors, as well as other semiconductors such as ternary materials, and transition metal compounds, preferably metal oxides, metal sulfides, and metal selenides. Examples of the radiation sensitive electrode include, without limitation, titanium oxide, zinc oxide, tungsten oxide, nickel oxide, $FeTiO_3$, $CdFe_2O_4$, $YFeO_3$, $SrTiO_3$, CdO, $V_2O_5$, $Bi_2O_3$, PbO, $Ta_2O_5$, $Nb_2O_5$, $SnO_2$, $ZrO_2$, $CeO_2$ mixed oxides, e.g., lead titanate, lead-lanthanum titanate, oxides containing metallic or polymeric inclusions, zinc sulfide, lead sulfide, cadmium sulfide, other metal sulfides, oxide/sulfide composites, selenides such as ZnSe, $ZrSe_2$, $HfSe_2$ and InSe, metallic or other dopants in any such compounds, compound semiconductors such as GaP, semiconductors of other compositions, such as doped silicon or germanium doped silicon carbide, photoconducting and semiconducting polymers such as polyvinyl carbazoles, polythiophenes, polyphenylene vinylenes, polyphenylenes and polyanilines. Other semiconductors or organic or inorganic dyes may be incorporated in this layer. The radiation sensitive electrode can also be a composite of several of the materials described above where one or more of the materials may be (homogeneously or heterogeneously) dispersed in the coating matrix or can consist of sequentially deposited layers. The light sensitive electrode can further be treated or coated to provide added functionality, such as enhanced hydrophobicity, hydrophilicity, corrosion resistance, charge transport and the like. Moreover, it is not necessary that this electrode be only a single layer as shown in the FIG. 1(A), but it may also consist of multiple layers.

Preferably, the radiation sensitive electrode 30 is titanium oxide or zinc-cadmium sulfide and most preferably titanium oxide. Exemplary dopants which may be included in the $TiO_2$ radiation sensitive electrode in an amount up to about 20 mol % include Ta, Nb, Sb, V, Ru and the like and combinations thereof.

Generally, the radiation sensitive electrode 30 is disposed on the first conducting electrode 20 by coating the conducting electrode with the radiation sensitive material, for example by wet chemical methods, such as by spin coating, roller coating, dip coating, spray coating, or any method based on meniscus coating. The radiation sensitive electrode can also be disposed on the first conducting electrode by chemical or physical vapor deposition, such as by plasma assisted chemical vapor deposition, evaporation, including electron beam evaporation and sputtering. This electrode can also be disposed by pyrolytic deposition (preferably by chemical vapor deposition) on a glass float line following the deposition of the conductive coating as described earlier. Typically, the radiation sensitive electrode has a thickness in the range of about 10 nanometers to about 100,000 nanometers, and preferably about 100 nanometers to about 10,000 nanometers. However, any thickness of the radiation sensitive electrode which will provide an sufficient radiation attenuation when exposed to an illumination source may be employed.

The radiation sensitive materials which may be employed in the radiation sensitive electrode 30 are typically semiconductors, photoconductors and photochemical species such as chlorophylls or ruthenium complexes. Light absorption and transmittance at specific wavelengths in the solar spectrum in such semiconducting materials may be dependent on their band gap or the difference between the valence and the conductance bands. The relative positioning of the valence and the conduction bands may contribute to the device potential and the reactivity of the charged carriers (such as holes or positive carriers). Thus, the degree of crystallinity (e.g. crystalline, microcrystalline, or amorphous), crystal structure, size of crystals, photoconductivity, band gap, the surface state, the stoichiometry, refractive index, porosity, thickness and other microstructural details may be manipulated by the method of preparation and choice of composition of the radiation sensitive material in order to impart variations in device behavior such as speed and depth of coloration, sensitivity to the spectrum of radiation, self bleaching duration, and overall transparency of the cell.

As an example, for titanium oxide (titania), the rutile crystalline phase has a different band gap as compared to the anatase phase. The thickness and the surface area of this electrode also determine the amount of light absorbed and also the interface area with the medium 40. The radiation sensitive electrode 30 can also be tungsten oxide or molybdenum oxide, etc., as they are also semiconductors with the semiconductive properties dependent on the microstructure and morphology of the material.

The radiation sensitive electrode 30 may be designed to absorb more strongly in the ultraviolet (UV) portion of the solar spectrum. This could also provide greater UV stability to the photochromic device particularly if any of the underlying materials are sensitive to UV radiation. For example, if titania is employed as the radiation sensitive electrode 30, then the degree of UV absorption can be modified by controlling the thickness of the titania layer or adding other components such as cerium oxide, zinc oxide or the like or combinations thereof.

Preferably the radiation sensitive electrode 30 does not substantially scatter light and has low haze (preferably scatters less than 0.5% of visible white light). However, radiation sensitive electrodes that scatter significant light can be used for some applications even if they are translucent. One such example is skylights and/or light pipes in buildings.

The radiation sensitive electrode 30 is preferably based on a titania coating or other single layer semiconductors. The radiation sensitive electrodes in this invention can also be based on multilayer 'p-n' junction semiconductors.

An important consideration for transmissive photochromic devices of this invention is that the transmission of the radiation sensitive electrode be high, with at least 50% transmission (visible region) preferred, at least 65% transmission more preferred and at least 75% transmission most preferred. The transmission of the radiation sensitive electrode can be enhanced by either reducing the coating thickness or by depositing the coatings in a grid form on the transparent conductor. This grid may be connected as in a sieve or may consist of a pattern of dots. The shape, size and spacing of the holes in the grid or of the dots, and the width or the area of the lines or dots will determine the transmission of the panel, the active area for light harvesting and the color uniformity, etc. These grids or patterns may be formed by standard photolithographic procedures well known to those skilled in the art.

The ion intercalative layer 50 is comprised of an intercalatable material capable of being intercalated with ions to cause a reversible color change in the material. Such intercalatable materials include, for example, without limitation tungsten oxide, tungstates, molybdenum oxide, molybdates, titanium oxide, vanadium oxide, vanadates, niobium oxide, polyviologens, polyanilines, polythiophenes, prussian blue, composites of these materials, cermets, mixed and doped oxides, and the like. Preferably, the ion intercalative electrode 31 is comprised of an inorganic metal oxide, most preferably tungsten oxide, the alkali metal tungstates or any of these materials doped with other transition elements such as Cr, V, Mn, Co, Mo, Ti, Nb and the like.

The ion intercalatable materials that can be employed in the ion intercalative electrode of this invention include inorganic materials, organic materials or blends and composites of inorganic and organic ion intercalatable materials. Exemplary inorganic ion intercalatable materials include $WO_3$, $V_2O_5$, $MoO_3$, $Nb_2O_5$, $TiO_2$, $CuO$, $NiO$, $Ir_2O_3$, $Cr_2O_3$, $CoO$, $Mn_2O_3$, $Fe_2O_3$, $MoS_2$, $TiS_2$, $WS_3$, other oxides, sulfides and the like. The preferred ion intercalative electrode of this invention is comprised of $WO_3$ or $MoO_3$, or their alkali metal (such as Li, K, Na, Rb or Cs) tungstates or molybdates, or any of these materials containing dopants such as the transition metals (e.g., Ti, Cr, V, Mn, Co and the like) in an amount up to about 30 mol %. These electrodes preferably have a thickness of about 100–1000 nm. These electrodes may also contain elemental particles of 1–100 nm, such as those based on Au, Cu, Pd, Rh, Pt and the like.

The ion intercalatable organic materials useful in this invention are generally polymers which are typically electronic conductors or semiconductors. A wide range of ion intercalatable polymers are known to those skilled in the art. Exemplary ion intercalatable polymers useful in the instant invention include, without limitation, polyphenylene vinylenes, polythienylene vinylenes, polyalkoxythienylene vinylenes, polyfurylene vinylenes, polythiophenes, polyisothianaphthenes, polyanilines, polyindoles, polyarylamines, polypyrroles, polyalkoxyphenylenes, polyphenylenes, polyperinaphthalenes, polynaphthylamines, polyvinylmetalocenes, carbon clusters (fullerenes) and carbon clusters containing polymers, polyimides, polyviologens. Other ion intercalatable polymeric materials which may be employed in the present invention include, without limitation, derivatives of the aforementioned polymers, such as those prepared by sulfonation or substitution, copolymers, blends and composites, where the matrix may be organic or inorganic but at least one of the components is from the polymers or their derivatives described above. Some typical examples of these composites and blends are polyaniline or polypyrrole with prussian blue, polyaniline with phthalocyanine and/or sulfonic acid containing polymers and polyaniline in a metal oxide matrix, such as $SiO_2$, $TiO_2$, $ZrO_2$, $V_2O_5$, $WO_3$ and the like. The ion intercalative electrode may also be composed of multiple layers of more than one of these materials. The ion intercalative electrode may also be coated with organic or inorganic ion transport (e.g., $H^+$, $Li^+$, $Na^+$ and the like) layers. This electrode may also be treated or coated with materials to enhance its functionality, e.g. hydrophobicity, hydrophilicity, corrosion resistance and the like or may even provide added interaction with the interconnecting medium.

The interconnecting medium 40 can be a solid or a liquid. The medium 40 may be polymeric, polyceram (i.e., organic—inorganic composites), ceramic, an ormosil (organically modified silicate) or an ormocer (organically modified ceramic). Medium 40 contains preferably a redox promoter. Without being bound to the theory, it is believed that the redox promoter assists in the radiation induced creation of charged carriers. Such redox promoters may include, for example, and without limitations, alcohols, hydroxy compounds, aldehydes, hydroxyl containing polyethylene or polypropylene oxides, water, materials based on mercaptans, organothiolates (e.g., 2-mercapto-1-methyl imidazole or the lithium salt of dimercaptothiadiazole) and their polymers and oligomers, and dissociable salts. For example, salts containing iodide or bromide as anions may function as redox promoters. When present, such dissociable salts may be preferably selected from the group consisting of lithium, sodium, potassium, rubidium, silver and cesium salts. Most preferably, the dissociable salt is lithium perchlorate, lithium triflate or lithium iodide. Generally, such dissociable salts may be present in the interconnecting medium in an amount from about 0.01% w/w of the medium to about 100% w/w and most preferably from about 0.1% w/w to about 10% w/w. However, the amount of dissociable salt in the liquid interconnecting medium need only be an amount sufficient to assist in transporting an electrical charge across the interconnecting medium.

Generally, the interconnecting medium 40 also contains a base, preferably an organic base, more preferably an organic amine selected from, for example, pyridine, t-butylpyridine, tributylamine, triethanolamine, 3-picoline, DBU (1,8-diazabicyclo[5,4,0]undec-7-ene) and the like. Such organic bases may be present in the interconnecting medium in an amount from about 0% w/w of the medium to about 100% w/w, preferably up to about 50% w/w, more preferably up to about 30% w/w and most preferably up to about 20% w/w.

The interconnecting medium 40 may comprise organic solvents such as propylene carbonate, sulfolane, dimethyl sulfoxide or γ-butyrolactone. Optionally and preferably, medium 40 can comprise a source of cations such as proton sources or alkali ion sources. A preferred medium 40 of the present invention is benzyl alcohol or lithium iodide in propylene carbonate (PC). Most preferably the medium 40 is a layer having a thickness from about 10 μm to about 1000 μm comprised of benzyl alcohol with at least one dissociable salt, at least one organic base and at least one UV stabilizer such as, for example, respectively about 0.1 molar lithium perchlorate, 10% (w/w) t-butyl pyridine and 0.5% (w/w)

Uvinul 400, an ultraviolet stabilizer available from BASF Corp., Wyandotte, Mich.

The interconnecting medium 40 may be a solid selected, for example, from thermoplastic or thermosetting polymers. This can be formed in-situ after the cell is filled with a liquid monomer composition or can be incorporated as a solid film using standard lamination techniques. The preparation of devices and methods of filling with a monomer composition by backfilling and two hole filling are described in U.S. Pat. No. 5,140,455 and by capillary filling in copending U.S. patent application Ser. No. 08/330,090, filed Oct. 26, 1994, the disclosure of both of which are incorporated by reference herein as if fully set forth.

The monomer composition can consist of polymerizable and/or crosslinkable monomers, typical examples of which can be found in copending U.S. patent application Ser. No. 08/023,675, filed Feb. 26, 1993 and in copending U.S. patent application Ser. No. 08/193,557, filed Feb. 8, 1994, the disclosure of both of which are incorporated by reference herein as if fully set forth. Some typical examples of reactive groups are epoxy, three to twelve membered rings (including those that expand on opening), vinyl groups (including acrylates and methacrylates), amines, anhydrides, polyols, mercaptans, carboxylic acids, etc. Polymers that can be formed include, without limitation, polyethers (including polyethylene oxide and polypropylene oxides), polyacrylonitriles, polysiloxanes, polyphosphazenes, acrylics, polyvinylbutyrals, ethyl vinyl acetate copolymers, polyvinylidene fluorides, polyimines, sulfonic acid containing polymers, other polymers consisting of electron donor heteroatoms such as oxygen, sulfur, nitrogen and those polymers prepared by blending and copolymerizing any of the above. The starting materials could be short or long chain molecules or mixtures thereof with reactive terminal ends along their main chain or as a part emanating from the branch of the main polymer. The composition could also consist of monomers and reactive inorganic fillers (such as fumed silica) to yield a solid interconnecting medium.

A solid interconnecting medium can also be processed by lamination. In this process a monomer composition can be poured as a liquid over one of the substrates, and then the second substrate is lowered to sandwich this liquid. The liquid is then polymerized into a solid. Alternatively, the interconnecting medium may be processed as a film (which may have to be supported on a release film to avoid blocking). This film is then laminated between the two substrates after the release layer is removed. The lamination procedure could be done by a number of standard methods as used in commercial laminated glazings, fiber reinforced composites and in Photo-voltaic modules, such as processes based on autoclaves, hot presses, vacuum bags or a diaphragm type laminating machine and the like. During the lamination process, the solid film may be further polymerized or crosslinked. There are several variations of this procedure.

Electrical connection means 60 provides a means for electrically connecting the first and second conductive electrodes. Electrical connection means includes, without limitation, wires, leads, or any low resistance pathway and the like.

The electrical connection means 60 preferably includes the control means 70 to provide the device of the present invention with user controllability. Exemplary control means include, without limitation, switches, sensors, optotransistors, photoresistors, photodiodes and the like. These control means can be employed with the necessary software, electronics and the like which are readily available to those skilled in the art.

Figure 2:
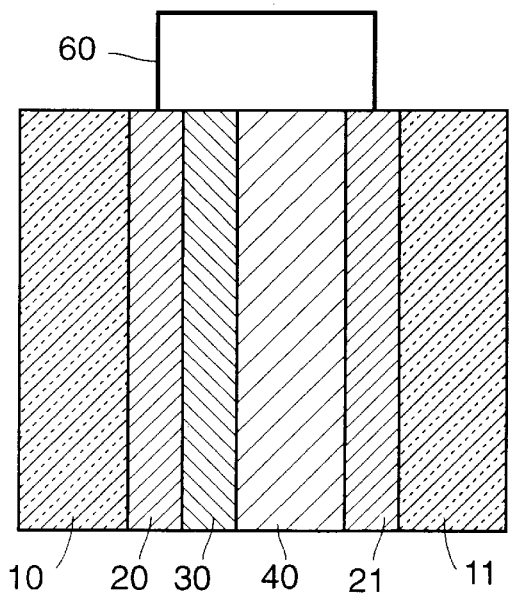
FIGS. 2, 3 and 4 are schematic views of several other embodiments of the UCPC transmissive device of this invention.

FIG. 2 illustrates another embodiment of this invention having a first substrate 10 with a first conducting electrode 20 disposed thereon, a second substrate 11 with a second conducting electrode 21 disposed therein. The first substrate 10/first conducting electrode 20 combination has a radiation sensitive electrode 30 disposed on the inner facing surface of the first conducting electrode 20 and is arranged so that an interconnecting medium 40 is disposed between the radiation sensitive electrode 30 and the second conducting electrode 21. In this embodiment, the function of the ion intercalative electrode 50 of FIG. 1(A) is replaced by a redox active species in the interconnecting medium 40. The redox active species is capable of undergoing a reversible color change. The interconnecting medium can contain more than one redox species. Exemplary redox active species include metallocenes and their derivatives, transition metals, rare earth ions and complexes thereof, as well as organic redox active species such as phenothiazines, viologens, phthalocyanines, iodides, bromides, hydroxyl containing material (e.g., alcohol proton donors) and the like. Another exemplary redox active species which may be employed in the interconnecting medium of this invention are the materials based on mercaptans, organothiolate (e.g., 2-mercapto-1-methyl imidazole or the lithium salt of dimercaptothiadiazole) and their polymers and oligomers.

Electrical connection means 60, shown in FIG. 2, provides an electrical path between the first conducting electrode and the second conducting electrode. Control means 70 (not shown) may be included in the electrical connection means 60 to provide a means of controlling the resistance of the electrical connection between the two conducting electrodes.

Figure 3:
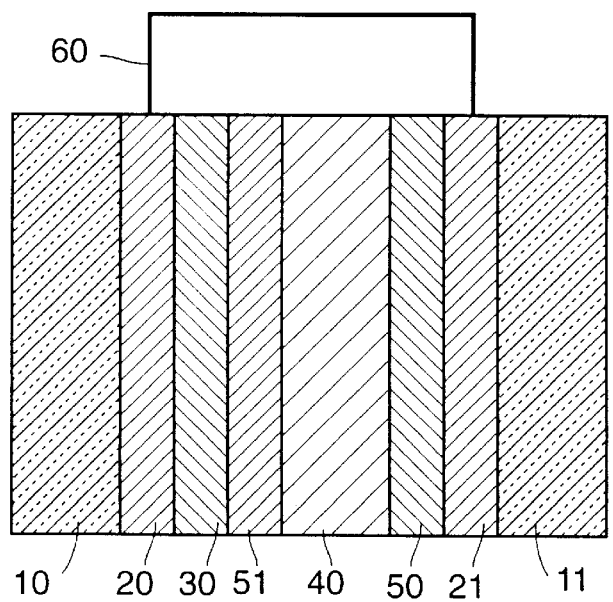

FIG. 3 illustrates another embodiment of the UCPC device of this invention. This embodiment has the identical elements shown in the device of FIG. 1(A), but also includes another ion intercalative layer 51 disposed between the radiation sensitive electrode 30 and the interconnecting medium 40. In this embodiment at least one of the ion intercalative layers 50 and 51 changes color upon ion intercalation.

Figure 4:
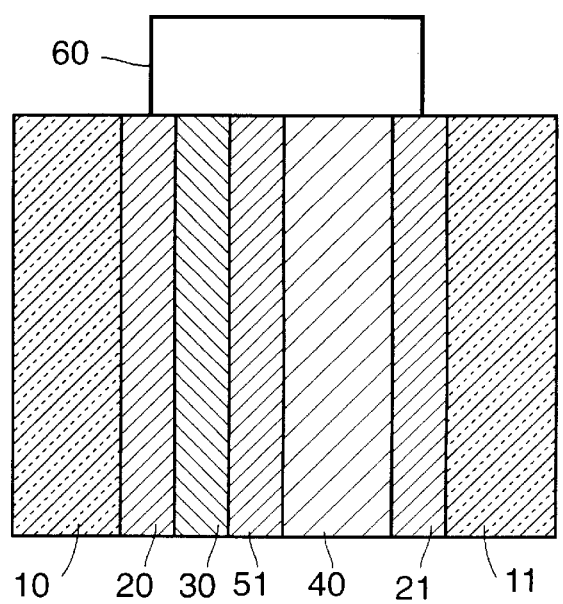

FIG. 4 shows yet another embodiment of the UCPC device of this invention. This embodiment is similar to the device illustrated in FIG. 1(A), with the exception that an ion intercalative layer 51 is disposed between the radiation sensitive electrode 30 and the interconnecting medium 40 and the ion intercalative layer 50 is not disposed between the interconnecting medium 40 and the second conducting electrode 20. In this embodiment the interconnecting medium 40 may also contribute to coloration due to redox activity.

The ion intercalative electrode 51 employed in the devices shown in FIGS. 3 and 4 is typically an oxidizable layer if the radiation sensitive layer 30 is an "n" type semiconductor or a reducible layer if layer 30 is a "p" type semiconductor. In the devices illustrated by FIGS. 2 and 4, the redox activity may involve a reversible plating of one of the interfaces in contact with the interconnecting medium 40 by a material such as Cu, Bi, Ag or combinations thereof which may be present in the medium.

Figure 5:
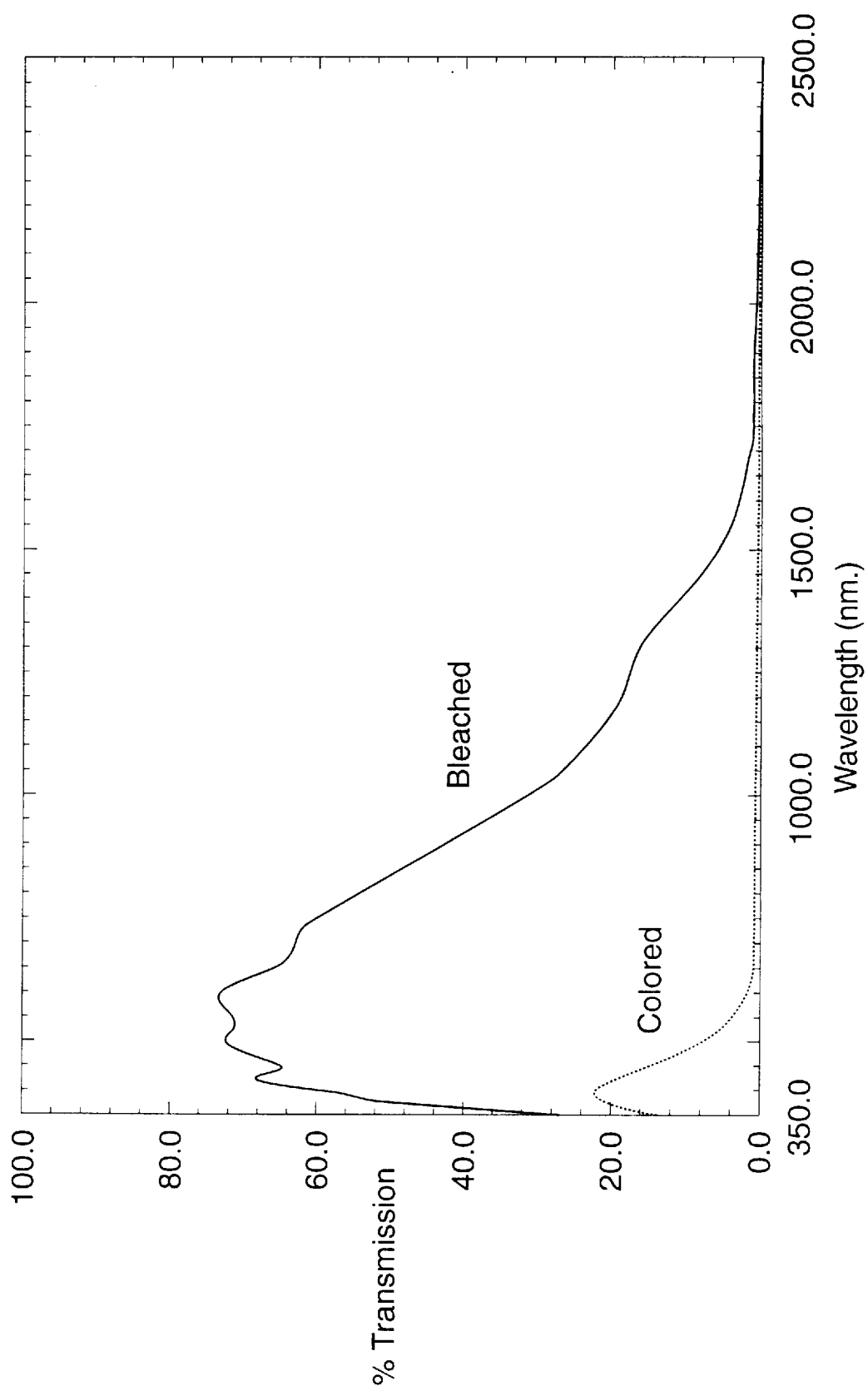
FIG. 5 is a transmission spectrum of a UCPC device in the bleached and colored states.

FIG. 5 is a graph illustrating the percent transmission of light of a PC device of this invention as a function of the wavelength of the light. This relationship, i.e., transmission v. wavelength, is illustrated for a PC device in the darkened state by the solid line and in the bleached state by the dashed line. The graph of FIG. 5 shows that the optical modulation of a PC device of this invention is both in the visible and near infrared (NIR) region of the solar spectrum. The modulation of this device can be modified by changing the nature of tungsten oxide. For example, crystalline tungsten oxide has been found to result in modulation only in the NIR region. Preferably less than 50%, more preferably less than 30% and most preferably less than 15% of the solar radiation in the NIR (750–2500 nm) is transmitted when the device of this invention is in the bleached state and preferably less than 10%, more preferably less than 5% and most preferably less than 3% of the solar radiation in the NIR is transmitted when the device is in the dim state. The optical modulation characteristics of the PC devices of this invention allow the devices to be used in applications requiring significant optical modulation, such as in architectural and automotive applications.

A preferred PC device of the present invention employs titanium oxide as a radiation sensitive electrode 30, tungsten oxide as an ion intercalative electrode 50 and benzyl alcohol with a dissolved lithium salt (e.g., lithium triflate, lithium perchlorate, etc.) as interconnecting medium 40. Other additives as described hereinafter may also be employed in the PC device of this invention. The substrates are preferably glass and the transparent conductive coatings are preferably ITO or fluorine doped tin oxide (e.g. TEC-Glass® or SUN-GATE® glass from LOF and PPG).

When the PC device of this invention is subjected to solar radiation it becomes fully dark only when the conducting electrodes 20 and 21 are electrically connected, such as, for example, by a conductive wire.

However, when the circuit is open between the two electrodes, then the device does not darken or only darkens to a partial percentage transmission as compared to when the circuit is closed. Control of the electrical connection between the two electrodes can be accomplished by inserting control means into the interconnection between the conducting electrodes 20 and 21, such as, for example, an on/off switch or a variable resistance control. It is also possible to use an electrical source, such as a battery, solar cell or any other power source in order to drive the PC device back to the bleached state after the user has allowed the device to become dark. The devices can be bleached by applying an appropriate voltage, typically less than 5 volts, preferably less than 2 volts with its polarity such that the positive pole is applied, for example, to the tungsten oxide in the preferred device described above.

The applied potential for bleaching the device need not be applied as a step, but could be a function of time, such as a number of small steps, an increasing linear or a nonlinear ramp between specific limits, and the like. Conversely, a current sink (or source) can be used as the driver to bleach the device subject to a maximum safe potential and quantity of charge that needs to be extracted (or inserted). One could also apply a voltage so that the current or the charge is extracted at a constant rate from the device, and again, the charge extraction rate (which could also vary with time) and a maximum potential can be specified. Depending on the optical transmission of the device, the bleaching could be varied, e.g., when the device has bleached to a specified transmission the voltage is removed. When a solar cell is employed with the device of this invention in order to provide a bleaching potential, the solar cell can be connected to a capacitor or a rechargeable battery, or any equivalent charge storage means, so that the user can bleach the device even under conditions where the solar cell is inefficient. Of course, an external bleach voltage is optional especially for any devices which may rapidly self bleach when the radiation source is removed.

Figure 6:
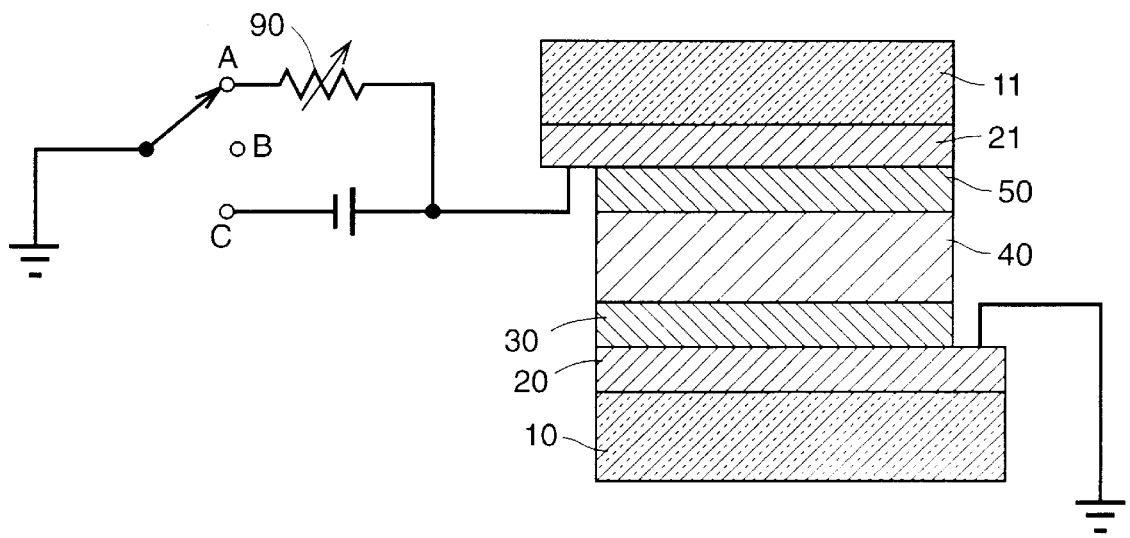
FIG. 6 is a schematic view of a UCPC window device having electrical connection means with control means shown by the illustrated circuit.

FIG. 6 illustrates an example of a UCPC window of this invention having electrical connection means with control means as shown by the circuit described therein. The reference numerals set forth in FIG. 6 are the same as described in FIG. 1(A). When the UCPC window device of FIG. 6 is exposed to light with a circuit switch in position B (float), i.e., in the open state, then no perceptible coloration occurs. However, user control can be initiated by setting the circuit switch to position A, and the UCPC window device will darken within a relatively short time period during exposure to the light. Variable resistor 90 can be continually user set to select any desired partial dimming state between the clear state where the UCPC device is at its highest transmission, and the dim state, where the UCPC device is darkened to its fullest extent under the prevailing intensity of radiation exposure. Thereafter, the UCPC window may be bleached by setting the circuit switch to position C by applying a positive voltage at the ion intercalative electrode 50 with respect to the radiation sensitive electrode 30. Thus, the switch illustrated in the circuit of FIG. 6 provides a means of advantageously controlling the PC device of this invention at the discretion of the user.

In the preferred configuration of this invention, the first substrate 10 with the radiation sensitive electrode 30 (e.g. $TiO_2$) faces the light source, e.g., the sun. The light passes through the substrate/first conducting conductive electrode 10/20 and encounters the radiation sensitive electrode 30. The radiation sensitive electrode may absorb part of the radiation and may generate both positive (holes) and negative (electrons) charged carriers. For the inventive device in the bleached state, i.e., the substantially colorless or transparent state, under such illumination and open circuit conditions, a potential difference can be measured between conducting electrodes 20 and 21 where electrode 20 is at a higher positive potential. This difference in potential is dependent on the intensity of light for a given device. When the circuit is closed the photogenerated charge carriers participate in a redox activity with the redox promoter contained in the interconnecting medium 40 resulting in ion insertion in intercalative electrode 31. Simultaneously electrons are injected into this layer from the connecting wire 60. The ion intercalative electrode 50 then becomes intercalated with cations and electrons and darkens. When this device is similarly subjected to radiation without shorting 20 and 21, electron transportation is severely reduced or even eliminated to the ion intercalative electrode 50 and hence the device only partially colors, if at all. Thus the user can choose to make the device photochromic by shorting the electrodes 20 and 21.

Moreover, by putting a resistor between the electrodes 20 and 21, one can affect the color kinetics or rate of coloration or depth of coloration. The rate of self-erasure of the device described above in the dimmed or colored state is preferably low, a desirable feature for many glazing applications. When a voltage is applied to electrode 21 which is positive with respect to electrode 20 or opposite to the polarity of the voltage generated by irradiating the sample with light, bleaching or recovery of the transmissive state is achieved.

The medium 40 can further consist of UV stabilizers, dyes and other redox promoters, heat stabilizers, water, viscosity modifiers, thickeners, plasticizers, cross-linkers, adhesion promoters, interface modifiers, wetting agents such as detergents, sacrificial agents which will preferentially reduce or oxidize (or intercalate) one of these layers during processing without any harmful effects on device performance, inert tinting dyes, anti-microbial agents, particulate and fumed organic and inorganic fillers, etc. Further, many of these additives could also be contained in the radiation sensitive electrode 30 or the ion intercalative electrode 50 to improve processability or modify the device performance. Also where solid interconnecting media are utilized, such additives can be incorporated for example by chemical bonding to the solid structure.

The UV spectral characteristics of the device of this invention can be tailored by using one or more UV stabilizer. For example, UV stabilizers available under the tradenames Uvinul® 400 ("UV 400") and Uvinul® 3050 from BASF Corporation could be used either alone, or, for example, in a 1:1 mixture.

Although many materials known to absorb ultraviolet radiation may be employed herein, preferred ultraviolet stabilizing agents include "UVINUL" 400 [2,4-dihydroxybenzophenone (manufactured by BASF Corp., Wyandotte, Mich.)], "UVINUL" D 49 [2,2'-dihydroxy-4,4'-dimethoxybenzophenone (BASF Corp.)], "UVINUL" N 35 [ethyl-2-cyano-3,3-diphenylacrylate (BASF Corp.)], "UVINUL" N 539 [2-ethyl hexyl-2-cyano-3,3'-diphenylacrylate (BASF Corp.)], "UVINUL" M 40 [2-hydroxy-4-methoxybenzophenone hydroxy-4-methoxybenzophenone (BASF Corp.)], "UVINUL" M 408 [2-hydroxy-4-octoxy-benzophenone (BASF Corp.)], "TINUVIN" T P [2-(2-H-benzotriazole-2-yl)-4-methylphenyl (manufactured by Ciba Geigy Corp., Hawthorne, N.Y.)], "TINUVIN" 327 [2-(3', 5'-di-t-butyl-2'-hydroxyphenyl)-5-chloro-benzotriazole (Ciba Geigy Corp.)], "TINUVIN" 328 [2-(3+,5'-di-n-pentyl-2-'hydroxyphenyl)-benzotriazole (Ciba Geigy Corp.)], "CYASORB" UV 24 [2,2'-dihydroxy-4-methoxy-benzophenone (manufactured by American Cyanamid Co., Wayne, N.J.)], monobenzoates (available from Eastmann Chemicals, Kingsford, Tenn. and Sandoz Chemical Corp., Charlotte, N.C.), resorcinol monobenzoates, formamidines (available from GivaudanRoure, Clifton, N.J.), phenylformamidine and combinations thereof, where a suitable range of the ultraviolet stabilizing agents is from about 0.2% (w/v) to about 40% (w/v), with about 5% (w/v) to about 15% (w/v) being preferred. The ultraviolet stabilizing agent should be chosen with an eye toward avoiding an adverse affect on performance and function.

In addition, ultraviolet absorbing layers may be coated onto, or adhered to, the first substrate and/or second substrate, and preferably the substrate closest to the source of UV radiation, to assist in shielding the photochromic device from the degradative effect of ultraviolet radiation. Suitable ultraviolet absorbing layers include those recited in U.S. Pat. No. 5,073,012 entitled "Anti-scatter, Ultraviolet Protected, Antimisting Electro-optical Assemblies", filed Mar. 20, 1990, the disclosure of which is incorporated by reference herein.

Examples of such layers include a layer of DuPont BE1028D which is a polyvinylbutyral/polyester composite available from E.I. DuPont de Nemours and Company, Wilmington, Del., and SORBALITE™ polymeric UV blockers (available from Monsanto Company, St. Louis, Mo.) which comprise a clear thin polymer film with UV absorbing chromophores incorporated, such as by covalent bonding, in a polymer backbone. The SORBALITE™ clear thin polymer film when placed on a surface of the substrate closest to the source of UV radiation (such as the sun), efficiently absorbs UV light below about 370 mm with minimal effect on the visible region. Thickness of the SORBALITE™ film is desirably in the range of about 0.1 microns to 1000 microns (or thicker); preferably less than 100 microns; more preferably less than about 25 microns, and most preferably less than about 10 microns. Also, UV absorbing thin films or additives such as of cerium oxide, iron oxide, titanium oxide, zinc oxide or such oxides with dopants can be used to protect the photochromic device from UV degradation.

The invention is further directed to methods of preparing the PC devices of this invention. One process of this invention entails forming a radiation sensitive electrode on the surface of a first conducting electrode and an ion intercalative electrode on a second conducting electrode, assembling the electrodes in a spaced-apart relationship to form a cell having the radiation sensitive electrode and the ion intercalative electrode facing each other, providing an interconnecting medium to fill the void in the cell and providing an electrical connection means for electrically connecting the first conducting electrode and the second conducting electrode. In another process of this invention, a second ion intercalative electrode is formed on the surface of the radiation sensitive electrode that is facing the second conducting electrode.

In yet another process of this invention, a radiation sensitive electrode is formed on a first conducting electrode and this electrode is assembled in a spaced-apart relationship with a second conducting electrode to form a cell having the radiation sensitive electrode facing the second conducting electrode. An interconnecting medium having a redox active species is provided to fill the void in the cell and a electrical connection means is provided for electrically connecting the two conducting electrodes. In still another process of this invention, an ion intercalative electrode is formed on the surface of the radiation sensitive electrode that is facing the second conducting electrode prior to assembling the device.

To provide the devices of this inventions with user controllability, the above-described processes may include providing control means with the electrical connection means to control the resistance of the electrical connection which may result between the two conducting electrodes. Exemplary control means include on/off switches and variably resistance switches. Other examples include, without limitation, voltage and current sources, opto-transistors and sensors for automated setting of transmission or bleaching or a timer to close the circuit.

In the processes of this invention, the radiation sensitive electrode can be formed, for example, by wet chemical methods, such as spin coating, roller coating, dip coating, spray coating and any method based on meniscus coatings or by chemical or physical vapor deposition or by pyrolytic coating on a glass float line following the deposition of the conductive coating. The ion intercalative electrode can be formed using similar methods.

The cell can be formed, for example, by assembling the substrate/conducting electrode/radiation sensitive electrode laminate and the substrate/conducting electrode/ion intercalative electrode so that both the conductive coated sides of the substrates face inward into the cell. The substrates can then be held together at the perimeter edges by a cured epoxy, for example, forming a seal, preferably with a slight offset to attach the conductive connection means, e.g. a conducting wire. The substrates are separated a predetermined distance, which can be done, for example, by either dispensing spacers (e.g., beads, spheres or cylinders) in the seal material or between the two substrates, thus forming a hollow cavity. The seal material can be thermoplastic or thermosetting plastic or an inorganic material, such as a low melting point glass. The cell spacing can also be controlled by using a laminatable or a thermosetting sheet or a double sided tape to form the seal for the cavity.

The interconnecting medium 40 can be formed by filling the cell of the assembled device with a liquid interconnecting medium, or if solid by establishing the medium prior to assembly of the device. With a liquid interconnecting medium it is preferred to fill the cell after device assembly. If a liquid monomer composition is employed, it can be in-situ polymerized to a solid interconnecting medium after filling the cell. The cell cavity can be filled with the interconnecting medium using methods described in U.S. Pat. No. 5,140,455, e.g., vacuum backfilling and two hole filling, or other methods such as capillary filling disclosed in copending U.S. patent application Ser. No. 08/330,090, filed Oct. 26, 1994.

In principle, the devices of this invention can also be fabricated by only using one substrate and then sequentially depositing a transparent conductor, a radiation sensitive electrode, an interconnecting medium and an ion intercalatable electrode followed by a transparent conductor to give a transmissive device similar in construction to FIG. 1. The coating process employed could be one readily known to the skilled artisan, such as physical vapor deposition, chemical vapor deposition, pyrolytic deposition or a wet chemical deposition or a combination thereof. The devices of this invention may be encapsulated, such as for example by deposition of barrier layers, for protection from the environment. A method to prepare an organic interconnecting medium may include mixing all the components in a carrier, such as a solvent, followed by coating the mixture onto a substrate by a wet chemical deposition method, such as spinning. The carrier may then be removed, for example, by evaporation and, if desired, the deposited layer can be polymerized by the application of heat or radiation.

The UCPC devices of this invention may be employed in many different applications. Since the device of this invention requires no external voltage for coloration, it may be used in a variety of functions which have not been previously commercially realized, such as in large-area applications. Other possible uses include architectural and automotive windows and glazings, sunroofs for automotive applications, shadebands and sunvisors, skylights, and display devices and systems.

A variety of control means 70 may be used to manipulate the performance of the UCPC devices of this invention depending on the specific application. Such control means may permit the user to manipulate the coloration of the cell. On the other hand, it is possible to employ sensors as a means of controlling the device so that the device darkens or bleaches at pre-determined illumination levels.

The UCPC device can employ a variety of sensors depending upon the method of control desired by the user. Such sensors can be coupled with manual controls so that the user may over-ride the behavior of the sensors. Exemplary sensors include, for example, IR sensors, visible light photopic sensors and temperature sensors as well as any combination thereof. These sensors can be integrally united with the device or external to the device. For example, a sensor wired to a UCPC glazing for an automobile may be mounted on the interior or exterior of a car to enable the UCPC device to respond to changing environmental conditions. More particularly, for example, a temperature sensor can be linked to the UCPC device so as to determine when the temperature in an automobile exceeds a pre-determined comfort level. At that point the circuit between 20 and 21 could then be shorted, allowing the device to color, and thereby reducing the amount of solar radiation entering the vehicle. Conversely, when the temperature in the car is below a pre-determined level, the circuit can be activated to keep the device in the bleached state and permit sunlight to enter the car. A photosensor could also be mounted inside the car such that it monitors the light transmission through the UCPC device. This could be used to automatically darken the device to a pre-determined contrast, or to maintain a constant level of light transmission throughout the day. Inputs from other external or internal heat or photosensors could be used in addition to this information to make more complex energy management decisions.

The above described sensors allow automated control of the transmissive properties of the device. However, manual control by the user is also possible. For example, the sensors could be operative with an over-ride option by the user. In such cases the user would have manual control over the device by tuning the transmissive properties of the device to meet immediate desired characteristics. For example, the extent of coloration of the device can be controlled by varying the resistance in the electrical interconnection connecting the two conducting electrodes. When the above-described sensors are used as control means 70 in an automotive sunroof several different controls and configuration may be employed. For example, the sensors and controlling circuitry may be made into an integrated permanent unit, in a 2 panel T-roof form, or in a single pull-out unit.

When such sensors are not integral with an automotive sun roof they may be located in different areas of the automobile depending on the nature of the sensor. For example, a temperature sensor could be located on the interior of the vehicle, some distance from the UCPC device itself. This would prevent the sensor detecting heat emitted by the device which might provide erroneous readings. An interior sensor could also be linked to an exterior senso so that operation would be determined by differential readings. This would impart greater sensitivity and accuracy of the device through multiple environmental samples. The preferred location for interior radiation sensors is immediately below the sunroof or directly behind the sunroof. The preferred location for exterior sensors will be as close as possible to the device, perhaps on the inactive portion or areas of the sunroof itself.

The use of fuzzy logic for control of the sensors used as control means 70 in the UCPC devices of this invention is particularly preferred. Fuzzy logic offers the easy combination of a number of different parameters for control operation. In this way a number of inputs may be assembled and analyzed in order to drive device operation. Fuzzy logic offers simplicity, reduced memory requirements, and the possibility of enhanced performance. It may also improve the cycling life of the device by avoiding over-voltages or current step inputs and represents a desirable approach to management of multiple controlling conditions.

When the UCPC device of this invention is used as an automotive sunroof, the active area of the sunroof may be a whole unit controlled by one or more sensors and controls or may be broken down into multiple units. For example, it is possible to have controls for various areas of a UCPC sunroof so that the transmissive state for the passenger and driver area may be varied individually. This may be accomplished by having two discrete UCPC units comprising a single sunroof, each with its own set of controls. Alternatively, a single unit could be controlled in different areas by selective etching of the transparent conductor of the device. The selective etching could also be used for other architectural or automotive glazing purposes. For example, the shadeband in the windshield could be made by this method so that the user of the control system could independently darken the shade band and not the rest of the window.

The control means 70 described above could also be combined with other features of an automobile to impart even greater functionality to the UCPC device. One example would be to link a UCPC sunroof to the twilight sentinel of the vehicle. In this manner, when the twilight sensor detects nighttime conditions, the UCPC device would be in open-circuit mode so that bleaching of the sunroof could be activated automatically. The twilight sentinel could be activated at all times (even when the car is parked) to detect conditions that would require coloration of the sunroof. The UCPC device could also be combined with the lighting and HVAC system of an automobile to create an integrated energy efficient system. For example, when the A/C is on and the lights are off, the circuit of the UCPC device could be shorted to achieve coloration of the sunroof. In this manner, cooling loads on the vehicle would be reduced thereby decreasing the required size of the HVAC system, improving the performance of the vehicle and decreasing the fuel consumption. The UCPC device may also be coupled with photosensors in rear-view mirrors which can monitor and respond to environmental and/or light changes on the exterior of the vehicle.

A number of additional features may be integrated with the UCPC device of this invention for more specialized applications. For example, solar cells could be placed on a UCPC sunroof or combined with the sunroof in a number of ways to provide a power source for rapid bleaching of the UCPC panel, if so desired. The transparent conductor layer may also be used to defrost or heat a UCPC sunroof. Anti-wetting agents could be applied to such a sunroof so that dirt or dust does not adhere to the surface of the sunroof and impair operation.

Figure 7:
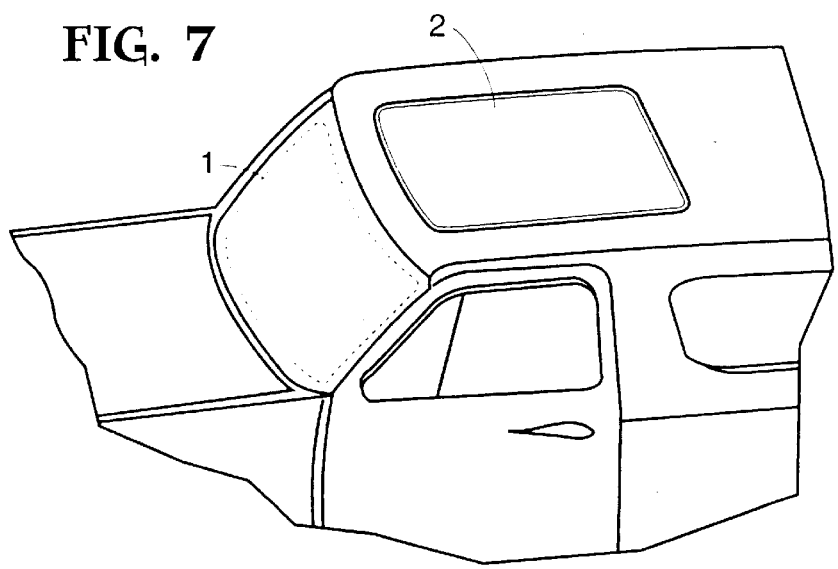
FIG. 7 is a fragmentary perspective view of a UCPC automotive windshield 1 and a UCPC automotive sunroof 2 incorporated in an automobile.

Other types of automotive glass may also be fabricated in a UCPC design. Side glass, quarter glass, windshields, backlights, shadebands, sun visor, interior and exterior mirrors, and privacy glass are all examples of potential UCPC devices. FIG. 7 is a fragmentary perspective of an automobile incorporating a UCPC automotive windshield 1 and a UCPC automotive sunroof 2. Control of the transmissive properties of automotive glass offers many advantages such as increased occupant comfort, decreased heating of the vehicle, reductions in HVAC system size, increased fuel efficiency and increased privacy. The glasses of the automobile (including, for example, a sunroof) could be controlled by control means 70, such as for example, a single sensor or by individual sensors and controls, corresponding to specific windows much like the controls used for electric windows and door locks. The sensors, controls and combinations thereof described previously in relation to automotive sunroofs may also be used as control means for other types of UCPC devices for the present applications.

Application of the present invention to windshields will particularly benefit from specialized controls due to requirements of a highly transmissive states (typically over 70%, with over 75% transmission preferred) for safe operation of the vehicle. In order to assure a highly transmissive state for the vehicle when in use, the windshield may be linked to an ignition control switch so that when the ignition is off and the car is parked the windshield could be darkened, but when the ignition is on the windshield will become bleached. The controls for such a UCPC windshield could be automated and linked to the ignition system. Remote control of any of the UCPC glass in the car is also possible. In this way the user could darken or bleach the windows on the car upon approach ensuring safety and personal security by control from a distance. It is contemplated that the UCPC device of this invention could also be used as privacy glass for specialized vehicles such as limousines, law enforcement vehicles or taxis.

A particularly important application of the UCPC devices of this invention is as architectural glazings such as windows or doors. It has been estimated that as much as 30% of a building's heating and cooling loads is due to energy losses through windows. Variations in the transmissive state of the structure's glass to respond to changing environmental conditions would increase the energy efficiency of the building. Use of the previously described sensor would permit automated control of the device. In addition, the device of the present invention could be linked into an integrated energy management systems. Inputs such as orientation of the building and windows, time of day, month of year, ambient air temperatures, occupancy of the rooms, type of room usage, temperature of the room and data collected from interior and exterior sensors could be utilized to selectively darken one or more windows to enhance energy efficiency. A master control by a centralized computer could then operate the windows of the buildings. Such a control could be part of the building's HVAC and daylighting system so that performance of these functions could be linked together. Any of the previously described control means (e.g. sensors, switches, etc.) may be used for architectural applications.

The ease of fabrication of the UCPC device of this invention permits its application to both flat and curved surfaces permitting it to be used for a variety of architectural applications. It may be fabricated as a stand alone unit or encased in an insulating glass unit to further augment the energy efficiency of the windows. In such cases, for maximizing the energy efficiency due to solar load, the UCPC element is preferably the outer element of the insulating glass unit. The UCPC element may also be used in other window configurations which incorporate a gas fill or which utilize coatings such as scratch resistant coatings or any other type of coatings. It is also applicable to windows that open either by sliding or hinges. It can also be applied to sunroofs or skylights in buildings to darken or bleach them at the discretion of the user. The UCPC device of this invention can be the skylight itself or can be a covering placed over or under a domed skylight. Such skylights could also be further connected to the energy management systems described above.

Eyewear and lenses also represent a useful application for the UCPC devices of this invention. Such PC devices may include, for example sunglasses, ski goggles, sports goggles and glasses, binoculars and telescopes, camera lenses, filters for cameras, welding helmets, motorcycle helmets, protective eyewear, medical eyewear or prescription eyewear as well as other types of glasses and lenses. In these cases it is desirable to have control over the degree of coloration of the lens in order to protect the eyes from harsh lighting, to decrease glare for increased comfort, and to allow the glasses to respond to changes in the lighting of the environment.

Power to bleach rapidly could be supplied to the eyewear through a rechargeable battery which may be powered by an attached solar cell. Controls could vary depending on the requirements of a specific application.

Control of the eyewear may also be possible by sensors mounted on the eyewear or on the lens or nearby. Light sensors, temperature sensors or thermochromic sensors are all possible. Such sensors and their use with the UCPC devices of this invention have been described previously for sunroof applications.

UCPC devices may also be used in display applications, including for example, use as filters for existing display systems as well as use as a novel display system. More particularly, the UCPC devices of this invention may be used as a filter for a TV screen or other form of information display which would take the input of ambient light and other point or a real light sources and respond to this light by darkening to an appropriate degree. In this manner, the display may be easily viewed despite high levels of lighting which often obscure the image. For such applications, the UCPC cell may be assembled as a portion of the information display itself. Particularly useful applications may include exterior display systems, TV screens, ATM machines and other displays which are exposed to high levels of light. The UCPC device may also serve as a display system by itself. Since the device responds to light by darkening, this may be used to create information displays. For such cases, the system is addressable by light and erasable by electricity. This feature could also be used for optical data storage, where writing and reading could be carried out by light sources of different wave lengths and erasure could occur by electricity.

UCPC devices may also be useful as sensors and labels for detecting UV radiation and exposure. The sensitivity of the UCPC devices can be tailored to specific radiation wavelengths. Certain chemicals, films, pieces of art, fabrics, foods etc. may be damaged by exposure to ultraviolet light. A small UCPC device affixed to the surface of the UV sensitive object could determine whether UV exposure had occurred. This exposure could be read by noting a color change in the UCPC device, with exposure signaled by a change from clear to dark. This would then permit the user to know whether harmful exposure had occurred and whether the object itself may be damaged in some way.

While the PC devices of this invention have many potential uses, they are particularly useful as photochromic mirrors, photochromic glazings and photochromic windows.

The photochromic mirrors of the present invention are suitable for use as photochromic rearview mirrors (e.g., truck mirrors, interior and exterior mirrors for motor vehicles), architectural mirrors or specialty mirrors, like those useful in aeronautical, periscopic or dental and medical applications.

In addition to photochromic mirrors, the PC devices of this invention have many applications, (some of which have been previously discussed in greater detail herein) such as photochromic glazings (e.g., architectural glazings, like those useful in the home, office or other edifice; aeronautical glazings, such as those which may be useful in aircraft; or vehicular glazings, for instance, windows, like windshields, side windows and backlights, sun roofs, sun visors or shade bands); photochromic privacy or security partitions; photochromic solar panels, such as sky lights; photochromic information displays; detection avoidance coating, and photochromic lenses and eye glass, may also benefit from that which is described herein.

The examples which follow are intended as an illustration of certain preferred embodiments of the invention, and no limitation of the invention is implied.

EXAMPLE 1

Preparation of $TiO_2$ Films

Method A:

A $TiO_2$ solgel precursor was prepared by mixing 5 g titanium isopropoxide (TIP) with 13.8 g dry distilled isopropanol (IPA) to form 1M TIP solution in IPA. The solution was then spincoated on 2 inch×2 inch TEC 10 conductive glass substrates and fired to 450° C. for 0.5 hr in air. The film thickness was 0.15 μm. X-ray diffraction of these films indicated that they consisted of anatase phase.

Method B:

Another $TiO_2$ precursor solution was obtained by mixing 0.5 g hydroxypropyl cellulose (HPC) with 13.8 g of IPA, after stirring and dissolution of the HPC in IPA overnight. 5 g of TIP was then added to the solution and the solution was then stirred for 4–6 hrs. The resulting precursor was spincoated on TEC 10 substrates and fired to 450° C. for 0.5 hr in air. The coatings were 0.5 μm thick.

Method C:

A $TiO_2$ slurry consisting of P-25 $TIO_2$ powder (210 Å in size; available from DeGussa) was prepared by mixing the powder in a mixture of water, 2,4-pentanedione and a surfactant, Triton X-100. The coating was deposited by spreading the liquid mixture over the conductive electrode, such as TEC 10 or TEC 20, through movement of a cylindrical rod. The coatings were fired to 450° C. The resulting $TiO_2$ films were about 1400 Å thick.

Method D:

Thin films of $TiO_2$ derived from colloidal dispersions were prepared as follows. One liter of deionized water was added to a two liter round bottom flask fitted with an over head stirrer and a condenser. This was stirred and heated to 60° C. Under vigorous stirring 0.1136 liters of titanium isopropoxide in 0.1 liters of isopropyl alcohol was added rapidly to the hot water. The mixture was heated to 100° C. to distill off the isopropyl alcohol. Complete removal of the alcohol was indicated by the distillation head temperature reaching 100° C. Once the alcohol was removed, 0.072 liters of a 25% (v/v) solution in water of tetramethylammonium hydroxide was added. The mixture was refluxed for six hours. It was then cooled to room temperature and filtered through a 0.45 μm filter. This resulted in a stable aqueous dispersion. This dispersion was concentrated under reduced pressure by removing some of the water and diluting with methanol or ethanol to form the coating dispersion. The concentration of the alcohol varied between 0 and 75% (v/v). Depending on the deposition method (e.g., spin, dip, roller or spray coating), the cosmetics of the films can be controlled by the alcohol content in the dispersion medium. X-ray diffraction showed that the as formed colloidal particles are of the anatase phase. After deposition on a conductive substrate, the coatings were fired from about 100° to about 350° C. for one hour under ambient atmosphere to enhance the durability of the $TiO_2$ film and to remove unwanted organic by-products. The resulting coatings were also crystalline anatase.

EXAMPLE 2

Preparation of $WO_3$ Coatings

Peroxy tungstic ester was prepared as described in U.S. Pat. No. 5,252,354, the disclosure of which is incorporated by reference herein. To prepare $WO_3$ coatings, a solution of the peroxy tungstic ester was prepared by dissolving 12.87 g of the ester in 30 cc of ethanol. To prepare $WO_3$ coatings which include lithium oxide, 0.18 g of lithium methoxide was added to this solution, the resulting precursor was then deposited on ITO (tin-doped indium oxide) coated glass substrates. The as-deposited films were fired in furnace at 135° C. using controlled humidity. The final $WO_3$ or $WO_3$/LiO coatings were amorphous according to X-ray diffraction. Typical thickness of the $WO_3$ coating was in the range of about 1500 to 5000 Å.

EXAMPLE 3

Cell Fabrication and Cell Filling

Method 1: Two hole filling

TEC 10 substrated were coated with $TiO_2$ according to the method set forth in Example 1. Two holes were then drilled into the top of the conductive (TEC 10) substrate. Cells were made by applying an epoxy containing spacers (e.g. 37 $\mu$m or 210 $\mu$m) to the perimeter of the $TiO_2$ coated substrate. The $WO_3$ coated substrate was then placed on top of the $TiO_2$ coated substrate, in a position which was slightly off-center. Clamps were applied to the assembly at the point of the epoxy to ensure intimate contact as well as to ensure that the cell spacing conformed to the spacer size in the epoxy. The cells were fired in a furnace at 120° C. for one hour to cure the epoxy. The medium was then injected through one of the holes in order to fill the cells. Both the holes were subsequently sealed using a room temperature epoxy. Exposed portions of $WO_3$ were etched using 1M aqueous NaOH. The conductive surfaces which protruded from either side of the cell were ultrasonically soldered with Indium. Wires were then attached to these Indium contacts.

Method 2: Backfilling

Cells were also prepared where no holes were drilled in the substrate but a small gap was left in the epoxy seal in an empty cell. After curing the epoxy, the cell was filled with an interconnecting medium by a backfilling process as described in U.S. Pat. No. 5,140,455.

EXAMPLE 4

A TEC 10 glass substrate (tin oxide coated glass having a conductivity of 10 ohms/sq.) was coated with $TiO_2$ according to Method A, Example 1. $WO_3$ coatings were applied to ITO were prepared according to Example 2. These substrates were combined to form a cell according to the procedure set forth in Example 3, method 1. An ethanolic lithium perchlorate ($LiClO_4$) medium was obtained by preparing 0.1M $LiClO_4$ in ethanol. This medium was introduced into the cell as described in Example 3, method 1. When this device was placed outdoors in sunlight, without any electrical connection between the two electrodes, no perceptible coloration occurred within 30 minutes. However, when an electrical path was provided between the two electrodes, coloration occurred. The transmission decreased from 70% T to 9% T after 15 minutes. The colored cell could then be bleached from 9% T to 70% T within 60 seconds at an applied voltage of 1.2 V with $WO_3$ positive with respect to $TiO_2$.

EXAMPLE 5

$TiO_2$ films prepared in Method B in Example 1 and $WO_3$ coatings obtained using the procedure of Example 2 were made in cells as described in Example 3, method 2. A medium based on 0.1M $LiClO_4$ in benzyl alcohol was prepared. The 210 $\mu$m spaced interpane void was then filled with this interconnecting medium, sealed and wires were soldered on. The transmission of this cell at 500 nm was 70%. When exposed to sunlight in the open state, i.e., the wires disconnected, no perceptible coloration occurred. However, when the wires were shorted together coloration developed within a short time, i.e., achieving 16% transmission within 30 mins. Bleaching to approximately 70% transmission was achieved in about 250 s at 1.2 V positive at $WO_3$ with respect to $TiO_2$. Another cell was similarly prepared with another medium consisting of 01M $LiClO_4$ in methoxyethanol. When exposed to sunlight with the wires shorted together, coloration developed within a short time, i.e., reading 8% transmission within 30 mins. When a positive voltage 1.0 V was applied to $TiO_2$ with respect to $WO_3$ during sunlight irradiation, the coloration was faster and deeper, reaching 3% transmission after 30 mins. During exposure to sunlight of this particular device, if a 1000 ohm resistor was connected across the electrodes, coloration only developed down to 40% transmission after 30 mins. compared to 8% transmission within the same time if the electrodes were shorted together.

EXAMPLE 6

Cells were made as in Example 5 but with 37 $\mu$m spacers and the medium now consisted of 0.1M $LiClO_4$ in benzyl alcohol plus an additional 10 vol % pyridine. The cell size was 3 inches by 3 inches. These cells colored to about 5% transmission within 30 mins. in the sun. Bleaching of this cell was accomplished in about 100 s at 1.2 V positive at $WO_3$ with respect to $TiO_2$. Cells made with pyridine exhibited good cyclability.

EXAMPLE 7

$TiO_2$/LiI:GBL/$WO_3$ Cell

A TEC 10 substrate was coated with a $TiO_2$ slurry as described in Method C, Example 1. A cell was made using this substrate and a second electrode coated with $WO_3$ as described in Example 2. The spacing between the two electrodes was provided by an O-ring, 2 in. diameter, and about 2.5 mm thick. The cell assembly was maintained with metal clamps. An interconnecting medium consisting of LiI and polyvinylbutyral (PVB) dissolved in $\gamma$-butyrolactone (GBL) was injected into the cell with a syringe. The two electrodes were connected together and the cell was exposed to a source of UV radiation in a UV chamber for 5 mins where upon the device became dark. The wires were disconnected and a potential of +1 V was applied to the cell, the positive wire to the $WO_3$ coated electrode. The device bleached in about 10 seconds. The cell was replaced in the UV chamber with the external wires still disconnected. No coloration occurred after 5 mins.

EXAMPLE 8

$TiO_2$/LiI:TS:UV400/$WO_3$ Cell

A cell consisting of a $TiO_2$ coated TEC 10 electrode and a $WO_3$ coated ITO electrode was made as described in Example 3. The cell was vacuum back filled as described in previously incorporated U.S. Pat. No. 5,140,455, with a medium consisting of LiI (0.1M) dissolved in sulfolane and containing 6% w/w of a UV absorber available under the tradename Univul® 400 from BASF. When the device was exposed to sunlight with no external connection between the two electrodes, no coloration of the device was seen after a few hours. When the cell was exposed to sunlight with an electrical connection between the two electrodes, the device darkened in a few minutes. The cell could be bleached by applying about 1.2 V across the two electrodes.

EXAMPLE 9

$TiO_2$/Solid Medium/$WO_3$ Cell

A TEC 10 substrate was coated with a $TiO_2$ slurry as described in Method C, Example 1. A cell was made using this substrate and a second electrode coated with $WO_3$ as described in Example 2. The spacing between the two electrodes was provided by an O-ring, 2 in. diameter, and about 2.5 mm thick. The cell assembly was maintained with metal clamps. A composition consisting of 0.7 g of acrylamide, 1.0 g of sulfuric acid, 3.0 g of ethylene glycol, 0.02 g of methylene bisacrylamide, and a few mg of Irgacure® 184 (a polymerization initiator sensitized to UV light available from Ciba-Geigy) was prepared, degassed, and protected from light. The mixture was injected in the cell with a syringe, and the composition was cured into a solid interconnecting medium by exposing the cell to UV radiation for 5 mins. The two electrodes were connected together and the cell was placed in an UV chamber for 5 mins. The device became dark. The wires were disconnected and a potential of +1 V was applied to the cell, the positive wire to the $WO_3$ coated electrode. The device bleached in about 3 seconds.

EXAMPLE 10

UCPC cells were fabricated with $TiO_2$ of different thickness prepared using the colloidal method described in Example 1 (method D). The thickness of the $TiO_2$ was 700, 500 and 180 nm respectively. The cells were made according to the procedure described in Example 3 (method 2), with a spacer size of 210 $\mu$m, and the cells were backfilled with an interconnecting medium consisting of 0.1M $LiClO_4$, 10 volume % 4-tert butylpyridine and 0.5 wt. % UV-400 in benzyl alcohol. The cells were shorted and exposed to the solar radiation for 48 minutes. Initially all the cells had an average percent transmission of 77% at 550 nm and after 48 minutes solar exposure they all colored at similar rates to a transmission of about 6%. The cells were bleached with a bleaching bias of 1.2 volts at $WO_3$ with respect to $TiO_2$. After 180 seconds the cells with 700 and 500 nm thick $TiO_2$ had completely bleached and after 150 seconds the cell with 180 nm thick $TiO_2$ had completely bleached.

EXAMPLE 11

Cells were fabricated with thin films of $TiO_2$ which were 700 and 800 nm thick prepared according to Example 1 (method D). The 700 nm thick $TiO_2$ was made into cells with a gap size of either 210 or 150 $\mu$m. The 800 nm thick $TiO_2$ was incorporated into a cell with a gap of 37 $\mu$m. All the cells were prepared according to the procedure described in Example 10. The cells were colored in the shorted mode by exposure to the solar radiation for 48 minutes. They all colored at similar rates and after 48 minutes had a transmission of 6% at 550 nm. The cells were bleached at 1.2 volts at $WO_3$ with respect to $TiO_2$. The bleaching rate decreased as the cell gap increased. The 37 $\mu$m cell bleached completely after 100 seconds, the 150 $\mu$m after 160 seconds and the 210 $\mu$m cell after 180 seconds.

EXAMPLE 12

$TiO_2$ derived from the colloidal route described in Example 1 (method D) was deposited at room temperature onto TEC 10 and heated to 100° C. for one hour prior to incorporation into a cell having a 150 $\mu$m cell gap. The cell fabrication was similar to that described in Example 10. On exposure to solar radiation the cell in the shorted mode colored from 71.3% T to 11.9% T in 48 minutes at 550 nm. The cell was bleached at 1.2 volts at $WO_3$ with respect to $TiO_2$ and changed its transmission at 550 nm from 11.9% to 71.3% T in 280 seconds.

EXAMPLE 13

$TiO_2$ derived from the colloidal route described in Example 1 (method D) was deposited at room temperature onto TEC 10 and heated to 350° C. for one hour prior to incorporation into a cell having a 210 $\mu$m cell gap. The cell was prepared as described in Example 10. The thickness of the $TiO_2$ layer was 500 nm. The cell was colored in the shorted mode by exposure to solar radiation for 48 minutes and changed its transmission at 550 nm from 78% T to 7.4% T. The cell was bleached at 1.2 volts at $WO_3$ with respect to $TiO_2$ and at 550 nm changed its transmission from 7.4% T to 75% T in 150 seconds. This cell was cycled by coloring under solar radiation for 13 minutes and then bleaching under an applied bias of 1.2 volts for 2 minutes. The cell was cycled 1,043 times without deterioration in its performance.

EXAMPLE 14

Cells were prepared with a cell gap of 210 $\mu$m as described in Example 10 and backfilled with a solution of 0.1 molar lithium perchlorate, 0.5 wt % UV400, 10 volume % 4-tert-butylpyridine in benzyl alcohol. The $TiO_2$ electrode was prepared from colloidal $TiO_2$ as described in Example 1 (method D). The cells were colored to below 15% T by exposure to solar radiation by placing the devices outdoors. They were then bleached at three different positive potentials (at $WO_3$ with respect to $TiO_2$) namely 0.8, 0.9 and 1.2 volts. The cell bleached at 0.8 volts changed its optical transmission from 15% T to 73% T in 280 seconds, at 0.9 volts the cell changed its transmission from 15% T to 73% T in 70 seconds. The cell bleached at 1.2 volts ($WO_3$ electrode positive) and changed its optical transmission from 15% T to 73% T in 60 seconds.

EXAMPLE 15

$TiO_2$ thin films were prepared from colloidal dispersions of different particle size distributions. The size distribution was controlled by varying the amount of tetramethylammonium hydroxide added to the dispersion at 100° C. A $TiO_2$ dispersion was prepared as described in Example 1 (method D) and from dynamic light scattering experiments the particle size distribution was bimodal with particles in the size range of 30 and 100 nm. For the procedure described in Example 1 (method D) the tetramethylammonium hydroxide concentration was increased by a factor of five. This gave a bimodal dispersion of average particle size equal to 35 and 16 nm. $TiO_2$ thin films were prepared from these dispersions and incorporated into cells according to the procedure described in Example 3 (method 2) by backfilling the cells with an interconnecting medium consisting of 0.1M $LiClO_4$, 10 volume % 4-tert butylpyridine and 0.5 wt. % UV-400 in benzyl alcohol. A cell containing $TiO_2$ prepared from the dispersion with the largest particles was colored in the shorted mode by exposure to solar radiation for 30 minutes and changed its transmission at 550 nm from 80% T to 26% T. The cell was bleached at 1.2 volts (positive at the $WO_3$ electrode) and at 550 nm changed its transmission from 26% T to 80% T in 50 seconds. A second cell containing $TiO_2$ derived from the smaller colloid particles was colored as previously described and changed its optical modulation from 80% T to 30% T in 30 minutes and bleached at 1.2 volts to 80% T in 30 seconds.

EXAMPLE 16

A thin film of $TiO_2$ was prepared from a peroxy titanium oxalate precursor as follows. 50 mL of titanium isopropoxide was added to a mixture at 0° C. of 200 mL of ethanol, 55.4 mL of 30 wt % hydrogen peroxide in water and 42.4 g of oxalic acid dihydrate. The red oxalate precursor was isolated by removing the ethanol, water and other volatile by-products under reduced pressure. 13.1 g of this material plus 0.63 g of oxalic acid dihydrate were dissolved in 100 mL of ethanol to form the coating solution. The viscosity of the solution was 1.87 cps. This solution was spin coated onto TEC 10 at 800 rpm and fired to 135° C. under a humid atmosphere or to 500° C. under ambient atmosphere for one hour respectively. These coatings were made into cells as described in Example 10. The cell with the low temperature (135° C.) amorphous $TiO_2$, when exposed to solar radiation in the shorted mode after 48 minutes changed its optical modulation from 81.0% T to 72.9% T at 550 nm, whereas the cell with the crystalline $TiO_2$ (500° C.) colored from 77.8% T to 16.4% T in 48 minutes. This cell having crystalline $TiO_2$, when bleached under a potential of 1.2 volts at $WO_3$ positive with respect to $TiO_2$ changed its optical modulation from 16.4% T to 77.8% in 20 seconds.

EXAMPLE 17

A cell was constructed as described in Example 13 except that the cell gap was 150 $\mu$m. This was colored in the shorted mode by exposure to solar radiation for 48 minutes and its transmission at 550 nm changed from 80% T to 25% T. The cell was bleached at 1.2 volts ($WO_3$ electrode positive) and at 550 nm changed its transmission from 20% T to 70% T in 30 seconds.

EXAMPLE 18

Preparation of Cells made with Ta-doped $TiO_2$.

A solgel $TiO_2$ precursor was prepared according to Method B in Example 1 with the exception that 0.36 g of tantalum ethoxide was also added to the solution to form a 1:0.05 stoichiometry of Ti:Ta. This solution was stirred and then spincoated on TEC 10 substrates. These coatings were next fired to 500° C. for 0.5 hr in air. Cells were made according to Example 6 and filled with interconnecting medium in the same manner as set forth in Example 6. The resulting cells colored to about 11% transmission from about 64% transmission in the initial state after 30 mins in the sun. When a potential of 1.2 V was applied to $WO_3$ with respect to the Ta-doped $TiO_2$ electrode, the cells bleached in less than 60 seconds. When the cells were prepared with undoped $TiO_2$ processed in a similar manner, the bleaching typically occurred in approximately 100 seconds.

EXAMPLES 19

A cell having a 37 $\mu$m cell gap was prepared as described in Example 3 (method B). The $TiO_2$ electrode was prepared as described in Example 1 (method B). The cells were back filled with 0.1 molar hydroquinone and 0.1 molar sodium perchlorate in propylene carbonate. The cells were shorted and exposed to the solar radiation for 48 minutes and they changed their optical transmission from 77% T to 22% T. They were then bleached using 1.0 volt at the $WO_3$ electrode positive with respect to $TiO_2$ resulting in the transmission changing from 22% T to 77% T in 220 seconds.

EXAMPLE 20

A cell was constructed as described in Example 10 with the $TiO_2$ (prepared as described in Example 1, method B) layer overcoated with a thin layer of conductive antimony doped tin oxide. The cell gap was 37 $\mu$m. The conductive tin oxide was prepared by reacting 100 g of $Sn(II)Cl_2$ in a 50/50 mixture of 30 volume percent hydrogen peroxide and glacial acetic acid at 0° C. for eight hours. Then 2.1 mL of $SbCl_5$ was added and the mixture allowed to react for a further 2 hours at 0° C. and then slowly warmed to room temperature. The mixture was then heated at 55° C. for 4 hours and the polystannoic acid derivative isolated by removing the solvent under reduced pressure at 65° C. The derivative was dissolved in 500 mL of ethanol and the product isolated again by removing the ethanol at 65° C. under reduced pressure. This product was dissolved in 500 mL of ethanol and filtered through a 2.5 $\mu$m filter. To this solution was added 21.19 g of oxalic acid dihydrate to form the coating solution. The coating solution was spin coated at 1,200 rpm onto the $TiO_2$ layer and then heated to 550° C. for one hour. The thickness of the antimony doped tin oxide overlayer was 200 nm and its specific resistivity was $2 \times 10^{-2} \Omega$cm. The shorted cell containing the $TiO_2$ electrode with the $SnO_2$/Sb overlayer was exposed to solar radiation for 48 minutes and changed its transmission at 550 nm from 79% T to 16% T. The cell was bleached at 1.2 volts ($WO_3$ electrode positive) and changed its transmission at 550 nm from 16% T to 72% T in 60 seconds.

EXAMPLE 21

A cell was prepared by depositing a thin film ion storage layer of $V_2O_5$ on top of the $TiO_2$ electrode. The $TiO_2$ electrode was prepared as described in Example 1 (method B). The storage layer, vanadium oxide, was prepared as follows. 10 mL of vanadium isopropoxide oxide was dissolved in 100 mL of anhydrous isopropyl alcohol. This solution was stirred at room temperature for one hour and then filtered through a one micron filter prior to coating. The solution was spin coated at 800 rpm onto a thin film of $TiO_2$ prepared using method B described in Example 1. The coating was heated to 350° C. for one hour. The thickness of the $V_2O_5$ ion storage layer was 200 nm. The charge capacity for lithium intercalation into the layer was 5,329 $C/cm^3$. The cell was configured by first reducing the $WO_3$ layer under argon in a three electrode cell containing $Ag/AgNO_3$ as the reference electrode and a platinum counter electrode. The interconnecting medium consisted of 0.1 molar lithium triflate in propylene carbonate. The $WO_3$ was reduced by applying $-1.0$ volts at the $WO_3$ electrode with respect to the platinum electrode until the current went to zero, indicating saturation. The charge capacity of the tungstate layer was 231 $C/cm^3$. At this stage the $WO_3$ electrode was deep blue in color. The $WO_3$ electrode was then made into a cell using a 135 $\mu$m gasket and the $TiO_2/V_2O_5$ electrode as the counter electrode. The cell assembly was maintained using metal clamps. The cell was filled with 0.1 molar lithium perchlorate in tetramethylene sulfone by the two hole filling method. The Li intercalated in the $WO_3$ layer was transferred into the $V_2O_5$ ion storage layer by applying a bleaching potential of 1.2 volts. This resulted in the transmission of the cell changing from 5% T to 43% T at 550 nm. The cell was then shorted and exposed to the solar radiation for 48 minutes. After 48 minutes the transmission changed from 43% T to 27% T at 550 nm. It was then bleached at 1.2 volts ($WO_3$ electrode positive) and its optical transmission changed from 27% T to 43% T in 200 seconds.

EXAMPLE 22

Device with a Cds thin film radiation sensitive electrode

Thin films of CdS were made by a wet chemical method. A precursor solution was prepared by mixing 1.33 g cadmium acetate dihydrate, 0.38 g thiourea, 0.50 g 2,4-pentanedione in 3.96 g methanol. This solution was spun on 3 inch×3 inch TEC 20 substrates (tin oxide coated glass having a conductivity of 20 ohms/□) and the films fired under $N_2$ at 250° C. for 1 hour. The films were light yellow. A cell consisting of a CdS coated TEC 20 electrode and a $WO_3$ coated TEC 20 electrode was vacuum backfilled as described Example 3, method 2 with an interconnecting medium consisting of LiI (0.1M) dissolved in PC and containing 5% of UV 400, an UV absorber available from BASF. The cell thickness was approximately 105 $\mu$m. The transmission of the device in its clear state was 78% T at 550 nm. When the cell was exposed to sunlight with no external connection between the two electrodes, no coloration of the device was seen after 1 hour. When the cell was exposed to sunlight with an electrical connection between the two electrodes, the device turned blue green in a few minutes. The transmission of the device at 550 nm was 16% T after only 5 minutes of sunlight exposure. The cell could be bleached in about 2 minutes by applying about 1.2 V across the two electrodes.

EXAMPLE 23

Device with a $Cd_xZn_{(1-x)}S$ thin film radiation sensitive electrode

Thin films of $Cd_xZn_{(1-x)}S$ were made by a wet chemical method. Precursor solutions were prepared by mixing appropriate amounts of cadmium acetate dihydrate, zinc acetate dihydrate, thiourea, 2,4-pentanedione in methanol to obtain a solution containing 1M thiourea, 1M 2,4-pentanedione and 1M of the Cd and Zn salts. These solutions were spun on 3 inch×3 inch TEC 20 substrates (20 ohms/□) and the films fired under $N_2$ at 450° C. for 1 hour. When the ratio x was about 0.4 to 0.6, the films were light yellow to colorless. A cell consisting of a $Cd_xZn_{(1-x)}S$ coated TEC 20 electrode (withx=0.4) and $WO_3$ coated TEC 20 electrode was vacuum backfilled as described in Example 3, method 2, with an interconnecting medium consisting of LiI (0.1M) dissolved in PC and containing 5.0 wt. % of UV 400, a UV absorber available from BASF. The transmission of the device in its clear state was 67% at 550 nm. When the cell was exposed to sunlight with no external connection between the two electrodes, no coloration of the device was seen after 4 hours. When the cell was exposed to sunlight with an electrical connection between the two electrodes, the device turned dark in a few minutes. The transmission of the device at 550 nm was 32.3% after only 3 minutes of sunlight exposure. The cell was be bleached in about 1 minute by applying about 1.2 V across the two electrodes ($WO_3$ positive).

EXAMPLE 24

Preparation of $TiO_2$-CdS cell

To form the precursors for CdS, 5-g of cadmium acetate was dissolved with 1 molar equivalent of 1.97 g of diethanolamine in isopropanol. Then 1 molar equivalent of 1.43 g of thiourea was added to this solution. 15 cc of 1M TIP solution in isopropanol containing 10 wt % HPC (hydroxylpropyl cellulose) was prepared according to Example 1B. To this TIP solution, 0.15 g of CdS precursor was mixed and stirred to form 1 mole % CdS doped $TiO_2$. The resulting $TiO_2$-CdS precursor was spincoated on TEC 10 glasses at 2000 rpm for 30 s and later fired to 400° C. Cells were prepared and vacuum backfilled as set forth in Example 3, method 2, with the electrolyte used in Example 9. The cells colored to 19% transmission after 15 mins in the sun and bleached in less than 150 s when a voltage of 1.2 V with respect to $TiO_2$ was applied at $WO_3$.

EXAMPLE 25

Thin films of $TiO_2$ and $WO_3$ were prepared as described in Example 1, method D, and Example 3, respectively. A polyurethane film (3 mil), available from Morton International, was placed on the $TiO_2$ electrode, 3×3 in. The polymeric film was covered with a solution of $LiClO_4$ (0.1M) in benzyl alcohol and the 3×3 inch $WO_3$ electrode was carefully placed on top of the softened polymeric film. The assembly was then laminated in a hot press vacuum laminator to give a robust laminated 3×3 device. The distance between the two electrodes was about 50 $\mu$m. The transmission of the device in its clear state was 76.5% at 550 nm. Electrical wires were attached on the slightly offset edge of each electrode. When the cell was exposed to sunlight with a connection between the two electrodes, the device turned blue in a few minutes. The transmission of the device at 550 nm was 12% T after 30 minutes of sunlight exposure. The cell could be bleached in about 2 minutes by applying about 1.0 V across the two electrodes. At least 10 coloring/bleaching cycles were performed in this manner, without noticeable degradation of performances.

EXAMPLE 26

A cell was made using an undoped $WO_3$ electrode with an overlayer of $LiNbO_3$ as the ion intercalative electrode. The $WO_3$ coating was prepared as described in U.S. Pat. No. 5,277,986, the disclosure of which is incorporated by reference herein. The $WO_3$ electrode was deposited by dip coating onto TEC 20 glass and then heating to 250° C. The final thickness of the coating was 500 nm. The tungsten oxide layer was further coated by a 60 nm layer of $LiNbO_3$ by a sol-gel process. The $LiNbO_3$ overlayer was prepared under a dry nitrogen atmosphere by dissolving 0.02 moles of niobium (V) ethoxide and 0.02 moles of 2,4-pentanedione in 60 milliliters of anhydrous ethanol. The solution was allowed to stir for one hour at room temperature. To this mixture was then added 0.02 moles of lithium acetylacetonate in 40 milliliters of anhydrous methanol. This solution was allowed to stir for one hour at room temperature. To this mixture was then added 0.02 moles of lithium acetylacetonate in 40 milliliters of anhydrous methanol. This solution was allowed to stir for 30 minutes and 0.3 milliliters of a 37% aqueous solution of hydrochloric acid in 0.6 milliliters of ethanol was added. The solution was dip coated onto the $WO_3$ layer and heated to 250° C. for one hour. This electrode was used to prepare a cell having a $TiO_2$ radiation sensitive electrode in the manner described in example 3, method 2. The cell was backfilled with an interconnecting medium consisting of 0.1M $LiClO_4$ and 10 volume % 4-tert butylpyridine in benzyl alcohol. The cell was shorted and exposed to a xenon arc light source of intensity 1000 W/m$^2$ and after 30 minutes the percent transmission in the photopic region of the spectrum changed from 71.3% to 8.8%. The cell was bleached with a bleaching bias of 1.2 volts at $WO_3/LiNbO_3$ with respect to $TiO_2$. After 3 minutes the cell bleached to its initial value. The cell was cycled 100 times, each cycle consisting of 13 minutes color exposure in a shorted state to a xenon arc light having an intensity of 1000 W/m$^2$ followed by bleaching at 1.2 volts for 3 minutes. After one hundred such cycles the cell showed no observable change in its optical modulation.

EXAMPLE 27

A cell was made as described in Example 26 except that the $WO_3$ electrode and the $LiNbO_3$ overlayer were formed at 350° C. The cell was shorted and exposed to a xenon arc light source of intensity 100 W/m$^2$ and after 30 minutes the transmission in the photopic region of the spectrum changed from 77.5% to 9.6% T. The cell was bleached with a bias of 1.2 volts at WO$_3$ with respect to TiO$_2$. After 5 minutes the cell bleached to 68% T.

EXAMPLE 28

A cell was made with undoped WO$_3$ heated to 350° C. as described in Example 26 and U.S. Pat. No. 5,277,986, the disclosure of which is incorporated by reference herein. This electrode was made into a cell with TiO$_2$ according to the procedure described in Example 3 (method 2) by backfilling with an interconnecting medium composed of 0.1M LiClO$_4$, 10 volume % 4-tert butylpyridine in benzyl alcohol. The cell was shorted and exposed to a xenon arc light source of intensity 100 W/m$^2$ and after 30 minutes the transmission in the photopic region of the spectrum changed from 77.0% to 5.9% T. The cell was bleached with a bias of 1.2 volts at WO$_3$ with respect to TiO$_2$. After 3 minutes the cell bleached to its initial value.

EXAMPLE 29

A TEC 10 glass substrate (tin oxide coated glass having a conductivity of 10 ohms/sq.) was coated with TiO$_2$ according to Example 1, method A. WO$_3$ coatings wee applied to TEC 10, according to Example 2. These substrates were combined to form a cell (53 µm thick cavity) according to the procedure set forth in Example 3, method 1. A liquid mixture was prepared with 20 ml benzyl alcohol, 1.78 g of Jeffamine ED900 (a diamine based on poly(propyleneoxide-co-ethyleneoxide), available from Texaco Chemical Company, Austin, Tex.), 1.31 g of DER 732 (an epoxy resin based on polypropyleneoxide, available from Dow Chemical Company, Midland, Mich.), 0.02 g UV400, and 0.24 g of LiCF$_3$SO$_3$. This combination of the epoxy and the amine hardener was chosen because of its ion conducting properties as described in the U.S. Pat. No. 5,300,374, the disclosure of which is incorporated by reference herein. This mixture was introduced into the cell as described in Example 3, method 1. The device was then heated in an oven at 115° C. for sixteen hours to cure the medium. When this device was placed outdoors in sunlight, without any electrical connection between the two electrodes, no perceptible coloration occurred within 30 minutes. However, when an electrical path was provided between the two electrodes, coloration occurred. The transmission decreased from 79.6% to 13.5% (measured at 550 nm) after 30 minutes. The colored cell could then be bleached from 13.5% to 79.6% within 5 minutes at an applied voltage of 1.2 V with WO$_3$ positive with respect to TiO$_3$.

EXAMPLE 30

A TEC 10 glass substrate was coated with TiO$_2$ according to Example 1, method A. A WO$_3$ coating was applied to a TEC 10 substrate, according to Example 2. A mixture was prepared by combining 15 g benzyl alcohol, 5 g Butvar B-73 (polyvinylbutyral, available from Monsanto, St. Louis, (Mo.), 1 g UV400, 0.12 g LiCF$_3$SO$_3$, 0.08 g LiClO$_4$, and glass spacers (14 µm in diameter). The mixture was heated at 120° C. for 24 hours and then stored. This mixture solidified on cooling to room temperature. Prior to the device assembly, the mixture was re-heated to 115° C. and poured onto the TiO$_2$ substrate. The WO$_3$ coated substrated was then placed on top of the medium, in a position that was slightly off-center. This assembly was then placed in a vacuum and simultaneously a pressure of about 13 p.s.i. was applied on the substrates for one hour at 100° C. The device was then cooled, removed, and then sealed with a room temperature curing epoxy. When this device was placed outdoors in sunlight, without any electrical connection between the two electrodes, no perceptible coloration occurred within 30 minutes. However, when an electrical path was provided between the two electrodes, coloration occurred. The transmission decreased from 73.7% to 15.2% (measured at 550 nm) after 30 minutes. The colored cell could then be bleached from 15.2% to 73.7% within 5 minutes at an applied voltage of 1.2 V with WO$_3$ positive with respect to TiO$_2$.

Other variations and modifications of this invention will be obvious to those skilled in the art.

We claim:

1. A photochromic device comprising (i) a first conducting electrode opposing a second conducting electrode, wherein at least one of said electrodes is transparent, (ii) a radiation sensitive electrode disposed on an opposing surface of said first conducting electrode, (iii) an interconnecting medium containing a redox promoter disposed between said second conducting electrode and said radiation sensitive electrode, (iv) an electrical connection means for electrically connecting said first conducting electrode and said second conducting electrode and at least one of:

(a) a first ion intercalative electrode disposed between said interconnecting medium and said second conducting electrode;
   (b) a second ion intercalative electrode disposed between said radiation sensitive electrode and said interconnecting medium; and
   (c) a redox active species in said interconnecting medium.

2. The photochromic device according to claim 1, further comprising control means for controlling the electrical connection between the first conducting electrode and the second conducting electrode.

3. The photochromic device according to claim 1, further comprising a first substrate disposed on an outer facing surface of said first conducting electrode and a second substrate disposed on an other outer facing surface of said second conducting electrode, wherein at least one of said substrates is transparent.

4. The photochromic device according to claim 1, wherein said device comprises the first ion intercalative electrode disposed between said interconnecting medium and said conducting electrode.

5. The photochromic device according to claim 1, wherein said device comprises the second ion intercalative electrode disposed between said radiation sensitive electrode and said interconnecting medium.

6. The photochromic device according to claim 1, wherein said device comprises both the first ion intercalative electrode and the second ion intercalative electrode.

7. The photochromic device according to claim 1, wherein said device comprises the redox active species in said interconnecting medium.

8. The photochromic device according to claim 1, wherein said radiation sensitive electrode is a semiconductor.

9. The photochromic device according to claim 1, wherein said radiation sensitive electrode is selected from the group consisting of titanium oxide, zinc oxide, tungsten oxide, nickel oxide, cadmium sulfide, zinc sulfide and mixtures thereof.

10. The photochromic device according to claim 1, wherein said radiative sensitive electrode is a p-n semiconductor or a Schottky junction.

11. The photochromic device according to claim 1, wherein at least one of said ion intercalative electrodes is comprised of an ion intercalatable material selected from the group consisting of tungsten oxide, tungstates, molybdenum oxide, molybdates, titanium oxide, vanadium oxide, vanadates, niobium oxide, polyviologens, polyanilines, polythiophenes, Prussian blue, composites thereof and mixtures thereof.

12. The photochromic device according to claim 1, wherein said first conducting electrode and said second conducting electrode are comprised of indium oxide doped with about 2 to about 20 mole % of tin oxide.

13. The photochromic device according to claim 1, wherein said first conducting electrode and said second conducting electrode are comprised of a fluorine doped tin oxide layer deposited on top of a non-iridescent coated transparent substrate.

14. The photochromic device according to claim 1, wherein said interconnecting medium is a solid or a liquid.

15. The photochromic device according to claim 1, wherein said interconnecting medium contains a dissociable salt selected from the group consisting of lithium, potassium, sodium, rubidium, silver and cesium salts.

16. The photochromic device according to claim 15, wherein said dissociable salt is selected from the group consisting of lithium perchlorate, lithium triflate, lithium iodide, lithium tetrafluoroborate and mixtures thereof.

17. The photochromic device according to claim 16, wherein said liquid interconnecting medium is comprised of said dissociable salt mixed with propylene carbonate, benzyl alcohol or mixtures thereof.

18. The photochromic device according to claim 1, wherein said interconnecting medium contains an organic base.

19. The photochromic device according to claim 18, wherein said organic base is an organic amine.

20. The photochromic device according to claim 19, wherein said organic amine is selected from the group consisting of pyridine, t-butylpyridine, tributylamine, triethanolamine, 3-picoline, 1,8-diazabicyclo[5,4,0]undec-7-ene and mixtures thereof.

21. The photochromic device according to claim 14, wherein said solid interconnecting medium is selected from a thermoplastic or a thermosetting polymer.

* * * * *

UNITED STATES PATENT AND TRADEMARK OFFICE
CERTIFICATE OF CORRECTION

PATENT NO. : 5,838,483

DATED : November 17, 1998

INVENTOR(S) : GIMTONG TEOWEE ET AL.

Page 1 of 3

It is certified that error appears in the above-identified patent and that said Letters Patent is hereby corrected as shown below:

COLUMN 4

Line 26, "on" should read --on a --;

COLUMN 8

Line 20, "an" should read --a--;

COLUMN 15

Line 28, "2-'hydroxyphenyl" should read --2'-hydroxyphenyl--;

COLUMN 16

Line 38, "ably" should read --able--;

COLUMN 18

Line 25, "sun roof" should read --sunroof--;

UNITED STATES PATENT AND TRADEMARK OFFICE
CERTIFICATE OF CORRECTION

PATENT NO. : 5,838,483

DATED : November 17, 1998

INVENTOR(S) : GIMTONG TEOWEE ET AL.

Page 2 of 3

It is certified that error appears in the above-identified patent and that said Letters Patent is hereby corrected as shown below:

COLUMN 19

Line 54, "states" should read --state--;

COLUMN 21

Line 5, " a real" should read --areal--;
    Line 45, "sun roofs," should read --sunroofs--;

COLUMN 22

Line 43, "as formed" should read --as-formed--;

COLUMN 23

Line 5, "substrated" should read --substrates--;
    Line 34, "were prepared" should be deleted;
    Line 66, "01M" should read --0.1M--;

COLUMN 24

Line 36, "where upon" should read --whereupon--;
    Line 53, "Univul" should read --Uvinul--;

UNITED STATES PATENT AND TRADEMARK OFFICE
CERTIFICATE OF CORRECTION

PATENT NO. : 5,838,483

DATED : November 17, 1998

INVENTOR(S) : GIMTONG TEOWEE ET AL.

It is certified that error appears in the above-identified patent and that said Letters Patent is hereby corrected as shown below:

COLUMN 29

Line 5, "described" should read --described in--;
    Line 7, "an" should read --a--;

COLUMN 31

Line 1, "100 W/m$^2$ should read --1000 W/m$^2$--;
    Line 16, "100 W/m$^2$" should read --1000 W/m$^2$;
    Line 25, "wee" should read --were--;
    Line 59, "(Mo.)," should read --Mo ),--.

Signed and Sealed this

Sixth Day of July, 1999

*Attest:*

Q. TODD DICKINSON

*Attesting Officer*     *Acting Commissioner of Patents and Trademarks*